US006539200B1

United States Patent
Schiff

(10) Patent No.: US 6,539,200 B1
(45) Date of Patent: *Mar. 25, 2003

(54) METHOD AND APPARATUS FOR PAGING A USER TERMINAL WITHIN THE "SWEET SPOT" OF A SATELLITE

(75) Inventor: Leonard N. Schiff, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/363,967

(22) Filed: Jul. 29, 1999

(51) Int. Cl.[7] .................................................. H04Q 4/00
(52) U.S. Cl. ........................ 455/12.1; 455/429; 455/456; 455/433
(58) Field of Search ................................. 455/429, 439, 455/442, 12.1, 13.1, 67.1, 423, 134, 135, 437, 424, 33.1, 54.1, 56.1, 517, 13.2, 33.3, 432, 427, 428, 445, 440, 393; 342/352, 354, 357

(56) References Cited

U.S. PATENT DOCUMENTS 5,369,681 A * 11/1994 Boudreau et al. ............ 455/456
5,537,681 A * 7/1996 Redden et al. ............... 455/428

(List continued on next page.)

FOREIGN PATENT DOCUMENTS

GB 2324680 10/1998

OTHER PUBLICATIONS

XP 000594283; Dinis M. et al.; "Location And Paging Area Definition And Its Impact On Mobile Satellite Management Signalling"; IEEE Vehicular Tech. Conference, US, NY, IEEE, vol. 46; Apr. 28, 1996.

(List continued on next page.)

Primary Examiner—Daniel Hunter
Assistant Examiner—Pablo N Tran
(74) Attorney, Agent, or Firm—Philip R. Wadsworth; Gregory D. Ogrod

(57) ABSTRACT

An apparatus and method for paging a user terminal (UT) using a satellite communications system having a gateway and one or more satellites, wherein each satellite produces a plurality of beams and each beam includes a plurality of channels. The method of the present invention includes the step of recalling a location of the UT, wherein the recalled location corresponds to a location of the UT at a time $t_1$. In one embodiment this is accomplished by performing a lookup in a table that includes location information for user terminals at different points in time. The method also includes the step of determining an area, based on the recalled location, within which the UT is assumed to be located at a time $t_2$, where time $t_2$ is later in time than time $t_1$. The next step is to determine a time $t_3$, where $t_3$ is equal to or later in time than time $t_2$, when the following two criteria are satisfied. First a satellite of the one or more satellites has an elevation angle between $\theta_1$ and $\theta_2$. Second, all locations within the area are located within a footprint of the satellite (that has an elevation angle between $\theta_1$ and $\theta_2$). The elevation angles $\theta_1$ and $\theta_2$ can be determined from the perspective of the recalled location. Alternatively, the elevation angle can be determined from the perspective of all locations within the area. This ensures that the UT is in the "sweet spot" of the satellite (where the gain of signals sent from the satellite are highest) when the UT is paged. A page is then sent from the gateway to the UT on a channel of a beam of the satellite at time $t_3$. The page can be sent on a channel of every beam of a plurality of beams that make up the footprint of the satellite at time $t_3$. Alternatively, the page can be sent on a channel of selected beams of the footprint. By waiting until the UT is within the "sweet spot" to page the UT, less power can be used by the satellite. In addition, this type of operation allows the UT to use an antenna that has a substantial gain only when the UT is within the "sweet spot". This allows the use of satellite power to be reduced further.

43 Claims, 14 Drawing Sheets

U.S. PATENT DOCUMENTS

| | | | | |
|---|---|---|---|---|
| 5,552,795 A | * | 9/1996 | Tayloe et al. | 342/357 |
| 5,612,701 A | * | 3/1997 | Diekelman | 342/354 |
| 5,619,209 A | * | 4/1997 | Horstein et al. | 342/352 |
| 5,659,545 A | * | 8/1997 | Sowles et al. | 370/324 |
| 5,699,069 A | * | 12/1997 | Faulkner | 342/352 |
| 5,745,841 A | * | 4/1998 | Reudink et al. | 455/62 |
| 5,809,396 A | * | 9/1998 | Armbruster et al. | 455/12.1 |
| 5,828,957 A | | 10/1998 | Kroeger et al. | |
| 5,842,130 A | * | 11/1998 | Oprescu-Surcobe et al. | 455/456 |
| 5,907,809 A | * | 5/1999 | Molnar et al. | 455/456 |
| 5,924,042 A | * | 7/1999 | Sakamoto et al. | 455/458 |
| 5,937,352 A | * | 8/1999 | Courtney et al. | 455/435 |
| 6,035,203 A | * | 3/2000 | Hanson | 455/458 |
| 6,052,561 A | * | 4/2000 | Rudowicz et al. | 455/13.1 |
| 6,058,308 A | * | 5/2000 | Kallin et al. | 455/432 |
| 6,067,442 A | * | 5/2000 | Wiedeman et al. | 455/13.1 |
| 6,072,986 A | * | 6/2000 | Blanchard et al. | 455/13.4 |
| 6,128,468 A | * | 10/2000 | Wyrwas | 455/12.1 |
| 6,137,441 A | * | 10/2000 | Dai | 342/357.16 |
| 6,138,012 A | * | 10/2000 | Krutz et al. | 455/427 |
| 6,163,679 A | * | 12/2000 | Bakke et al. | 455/12.1 |
| 6,208,858 B1 | * | 3/2001 | Antonio et al. | 455/429 |
| 6,233,451 B1 | * | 5/2001 | Noerpel et al. | 455/427 |

OTHER PUBLICATIONS

XP 002145665; Meenan C. et al.; "Intelligent Paging Schemes For Non–GEO Satellite Personal Communication Networks"; IEEE $47^{th}$ Vehicular Tech Conference; May 4–7, 1997; pp. 515–519 vol. 2.

* cited by examiner

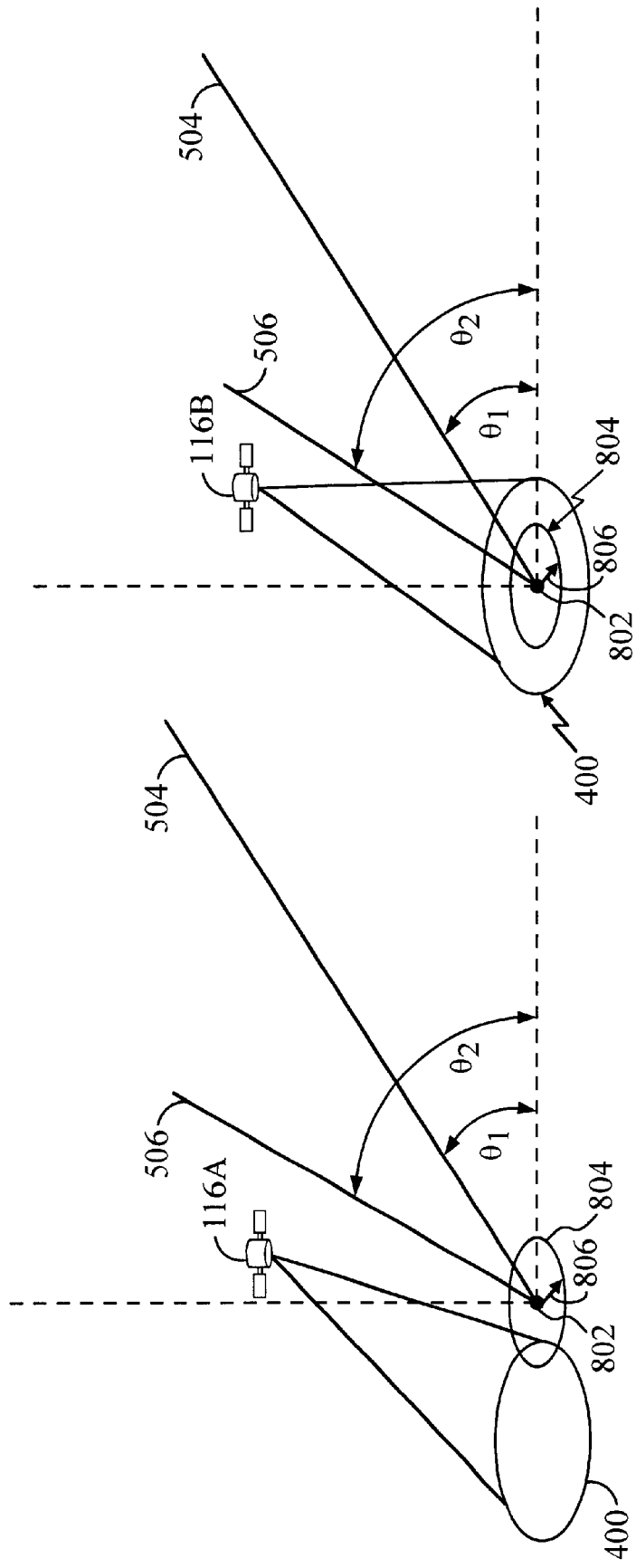

METHOD AND APPARATUS FOR PAGING A USER TERMINAL WITHIN THE "SWEET SPOT" OF A SATELLITE

CROSS-REFERENCE TO RELATED APPLICATIONS

This application is related to commonly-invented and commonly-owned applications entitled "Apparatus and Method for Paging" having application Ser. No. 09/281,834 filed Mar. 30, 1999 and "Method and Apparatus for Minimizing the Number of Channels Used for Paging" having application Ser. No. 09/305,180 filed May 4, 1999, which are incorporated herein by reference.

BACKGROUND OF THE INVENTION

I. Field of the Invention

The present invention relates generally to satellite communication systems, and more particularly, to a method and apparatus for paging a user terminal located within a strongest signal coverage area or "sweet spot" of a satellite.

II. Related Art

Conventional satellite-based communication systems include gateways and one or more satellites to relay communication signals between the gateways and one or more user terminals. A gateway is an earth station having an antenna for transmitting signals to, and receiving signals from, communication satellites. A gateway provides communication links, using satellites, for connecting a user terminal to other user terminals or users of other communication systems, such as a public switched telephone network. A satellite is an orbiting receiver and repeater used to relay information. A user terminal is a wireless communication device such as, but not limited to, a wireless telephone, a data transceiver, and a paging receiver. A user terminal can be fixed, portable, or mobile, such as a mobile telephone.

A satellite can receive signals from and transmit signals to a user terminal provided the user terminal is within the "footprint" of the satellite. The footprint of a satellite is the geographic region on the surface of the Earth within the range of signals of the satellite. The footprint is usually geographically divided into "beams," through the use of beam-forming antennas. Each beam covers a particular geographic region within the footprint. Beams may be directed so that more than one beam from the same satellite covers the same specific geographic region.

Some satellite communications systems employ code division multiple access (CDMA) spread-spectrum signals, as disclosed in U.S. Pat. No. 4,901,307, issued Feb. 13, 1990, entitled "Spread Spectrum Multiple Access Communication System Using Satellite or Terrestrial Repeaters," and U.S. Pat. No. 5,691,974, which issued Nov. 25, 1997, entitled "Method and Apparatus for Using Full Spectrum Transmitted Power in a Spread Spectrum Communication System for Tracking Individual Recipient Phase Time and Energy," both of which are assigned to the assignee of the present invention, and are incorporated herein by reference.

In satellite communication systems employing CDMA, separate communication links are used to transmit communication signals, such as data or traffic, to and from a gateway. The term "forward communication link" refers to communication signals originating at the gateway and transmitted to a user terminal. The term "reverse communication link" refers to communication signals originating at a user terminal and transmitted to the gateway.

On the forward link, information is transmitted from a gateway to a user terminal over one or more beams. These beams often comprise a number of so-called subbeams (also referred to as frequency division multiple access (FDMA) channels, or CDMA channels) covering a common geographic area, each occupying a different frequency band. More specifically, in a conventional spread-spectrum communication system, one or more preselected pseudorandom noise (PN) code sequences are used to modulate or "spread" user information signals over a predetermined spectral band prior to modulation onto a carrier signal for transmission as communication signals. PN spreading is a method of spread-spectrum transmission that is well known in the art, and produces a communication signal with a bandwidth much greater than that of the data signal. On the forward link, PN spreading codes or binary sequences are used to discriminate between signals transmitted by different gateways or over different beams, as well as between multipath signals. These codes are often shared by all communication signals within a given subbeam.

In a conventional CDMA spread-spectrum communication system, "channelizing" codes are used to discriminate between different user terminals within a satellite sub-beam on a forward link. The channelizing codes form orthogonal channels in a subbeam over which communication signals are transferred. That is, each user terminal has its own orthogonal channel provided on the forward link by using a unique channelizing orthogonal code. Walsh functions are generally used to implement the channelizing codes, also known as Walsh codes or Walsh sequences, and create what are known as Walsh channels. A typical orthogonal code length is 64 code chips for terrestrial systems and 128 code chips for satellite systems.

A majority of the Walsh channels are traffic channels that provide messaging between a user terminal and a gateway. The remaining Walsh channels often include pilot, sync, and paging channels. Signals sent over the traffic channels are generally meant to be received by only one user terminal, although messages can also be broadcast to multiple users. In contrast, paging, sync, and pilot channels may be monitored by multiple user terminals.

When a user terminal is not involved in a communications session (that is, the user terminal is not receiving or transmitting traffic signals), the gateway can convey information to that particular user terminal using a signal known as a paging signal (also referred to herein as a page). Paging signals are often sent by the gateway to establish a communication link, to tell a user terminal that a call is coming in, to reply to a user terminal trying to access the system, and for registration of the user terminal. For example, when a call or request for a communications link has been placed to a particular user terminal, the gateway alerts the user terminal by means of a paging signal. Additionally, if the gateway is sending a short message to a user terminal, such as a request for a location update of the user terminal, the gateway can send such a request by means of a paging signal. Paging signals are also used to distribute channel assignments and system overhead information. Paging signals are usually transmitted over paging channels, which are briefly discussed above. Each paging signal includes an identity number so that the user terminals listening to the paging channel know if the paging signal is addressed to them. If a paging signal is meant for multiple user terminals, the paging signal includes an identity number that corresponds to the multiple user terminals.

A user terminal can respond to a paging signal by sending an access signal or access probe over the reverse link (that is, the communications link originating at the user terminal and terminating at the gateway). The access signal is also used to register with a gateway, to originate a call, or to acknowledge a paging request by a gateway. The access signal is usually transmitted over channels specifically designated as access channels, which are briefly discussed below. The reverse link also includes traffic channels for providing messaging between a user terminal and a gateway.

If a user terminal is merely sending a location update in response to a location update request that is received from a gateway over a paging channel, the user terminal may send location update information as an access probe over an access channel. By using paging channels and access channels to convey short messages (such as location update requests and location update information), forward and reverse traffic channels are reserved for longer communications such as voice calls.

When a gateway sends a paging signal to a user terminal, the gateway usually does not know the location of the user terminal. Therefore, in contemporary satellite communications systems, the gateway usually sends a paging signal over many paging channels. At worst, the gateway sends the paging signal over every paging channel that is supported by the gateway serving the particular user terminal. This sending of a paging signal over many paging channels is often referred to as flood paging. Flood paging, though inefficient and wasteful, is relatively inexpensive when used to set up voice calls. This is because the resources used to flood page are relatively small compared to the resources used for a typical two or three minute voice call. More specifically, the total capacity and power used to flood page is relatively small compared to the total power and capacity used to support the voice call. Thus, flood paging, though not efficient, has proven useful in voice systems. However, flood paging may become unacceptable when used for setting up voice calls, if, for example, the number of call set up requests increases to the point where paging channel capacity becomes a scarce resource.

The inefficiencies of flood paging are not acceptable in many other types of messaging systems, such as in a position determination system where the response to a paging message may be a relatively short acknowledgment message and/or a location update message. This is because the resources used to flood page are quite large as compared to the information sent in response to the flood page. More specifically, the total power and capacity used to flood page is relatively large compared to the total power and capacity used to support the response to the flood page (for example, an acknowledgment or location update message).

An example of an industry in which position determination is particularly useful is the commercial trucking industry. In the commercial trucking industry an efficient and accurate method of vehicle position determination is in demand. With ready access to vehicle location information, a trucking company home base obtains several advantages. For example, a trucking company can keep the customer informed of location, route and estimated time of arrival of payloads. The trucking company can also use vehicle location information together with empirical data on the effectiveness of routing, thereby determining the most economically efficient routing paths and procedures.

In order to minimize the power and capacity used to track the location of a truck, a location update request can be sent to a user terminal (often referred to as a Mobile Communications Terminal or MCT in the trucking industry) within the truck periodically (for example, once every hour). To further save resources, the collection of location updates should be accomplished without utilizing traffic channels. To accomplish this, a location update request message can be sent as a paging signal over a paging channel. To further minimize the power and capacity used, the number of paging channels used to transmit the paging signal should be minimized for the reasons discussed above. To even further minimize the power used, the paging signal should only be sent when the user terminal (being paged) is within the "sweet spot" of the satellite(s) (that is used to send the paging signal). The "sweet spot" of the a satellite is an area or region of coverage by the satellite beams where the gain of signals sent from that satellite is high, referred to as peaked up. That is, where the strength of the signals is relatively high. This is an area that is substantially better for signal propagation for the user terminal.

Thus, as discussed above, there is a need for an apparatus and method for reducing the number of paging channels used to page a user terminal. Additionally, there is a need to minimize the amount of power, per channel, used to page a user terminal. Even though the initial need for the reduction of flood paging was inspired by the reduction of flood paging in a position determination system, the system and method of the present invention is useful in many types of satellite communication systems that uses channels (identical to or similar to paging channels) for conveying information to a user terminal that is not involved in a communications session.

The present invention is most useful when used for an application where a user terminal does not need to be immediately paged. That is, the present invention is most useful for an application where a gateway can wait, until certain conditions are satisfied, before it sends a page to a user terminal. For example, the present invention is useful in a system where paging channels are used for requesting location updates.

SUMMARY OF THE INVENTION

The present invention is directed toward a method and apparatus for paging a user terminal (UT) using a satellite communications system having a gateway and plurality of satellites, wherein each satellite produces a plurality of beams and each beam includes a plurality of channels. The method of the present invention includes the step of recalling a location of the UT, wherein the recalled location corresponds to a location of the UT at a time $t_1$. In one embodiment, this is accomplished by using a look-up table, database, or memory elements in which location information for user terminals at different points in time is stored. The method also includes the step of determining an area, based on the recalled location, within which the UT is assumed to be located at a time $t_2$, where time $t_2$ is later in time than time $t_1$. The next step is to determine a time $t_3$, where $t_3$ is equal to or later in time than time $t_2$, when the UT is located within a predetermined preferential portion of the satellite footprint, also referred to as the "sweet spot" of the satellite, which is defined as a region where the gain of signals transmitted by the satellite is highest. The "sweet spot" of a satellite can be specified from the perspective of a satellite or of a point on the Earth, such as the recalled UT location. The preferential location can be selected using elevation angles for the satellite relative to the UT of interest. For example, a user terminal is considered to be within the "sweet spot" of a satellite when the following two criteria are satisfied. First, a satellite of the plurality of satellites has an elevation angle between two pre-selected angles $\theta_1$ and $\theta_2$ from the perspective of the user terminal. Second, all locations within the area determined above are located within a footprint of the satellite (that has an elevation angle between $\theta_1$ and $\theta_2$). The elevation angles $\theta_1$ and $\theta_2$ can be determined from the perspective of the recalled location. Alternatively, the elevation angles can be determined from the perspective of all locations within the area. This ensures that the UT is in the "sweet spot" of the satellite (where the gain of signals sent from the satellite are highest) when the UT is paged. A page is then sent from the gateway to the UT on a channel of a beam of the satellite at time $t_3$. The page can be sent on a channel of every beam of a plurality of beams that make up the footprint of the satellite at time $t_3$. Alternatively, the page can be sent on a channel of selected beams of the footprint. By waiting until the UT is within the "sweet spot" to page the UT, less power can be used by the satellite. In addition, this type of operation allows the UT to use an antenna that has a radiation pattern that exhibits a substantial or higher gain only at higher elevation angles or when the UT is within the "sweet spot". This allows the use of satellite power to be reduced further.

BRIEF DESCRIPTION OF THE FIGURES

The features, objects, and advantages of the present invention will become more apparent from the detailed description set forth below when taken in conjunction with the drawings in which like reference characters identify corresponding elements throughout and wherein:

FIGS. 8A–8D illustrate a satellite at four different points in time, wherein FIG. 8A illustrates the satellite at a first point in time, FIG. 8B illustrates the satellite at a later point in time, FIG. 8C illustrates the satellite at an even later point in time, and FIG. 8D illustrates the satellite at a latest point in time.

DETAILED DESCRIPTION OF THE PREFERRED EMBODIMENTS

I. Introduction

The present invention is particularly suited for use in communications systems employing low Earth orbit (LEO) satellites, wherein the satellites are not stationary with respect to a point on the surface of the Earth. However, the invention is also applicable to satellite systems in which the satellites travel in non-LEO orbits.

A preferred embodiment of the invention is discussed in detail below. While specific steps, configurations and arrangements are discussed, it should be understood that this is done for illustrative purposes only. A preferred application is in CDMA wireless spread spectrum communication systems.

II. An Exemplary Satellite Communications System

Figure 1A:
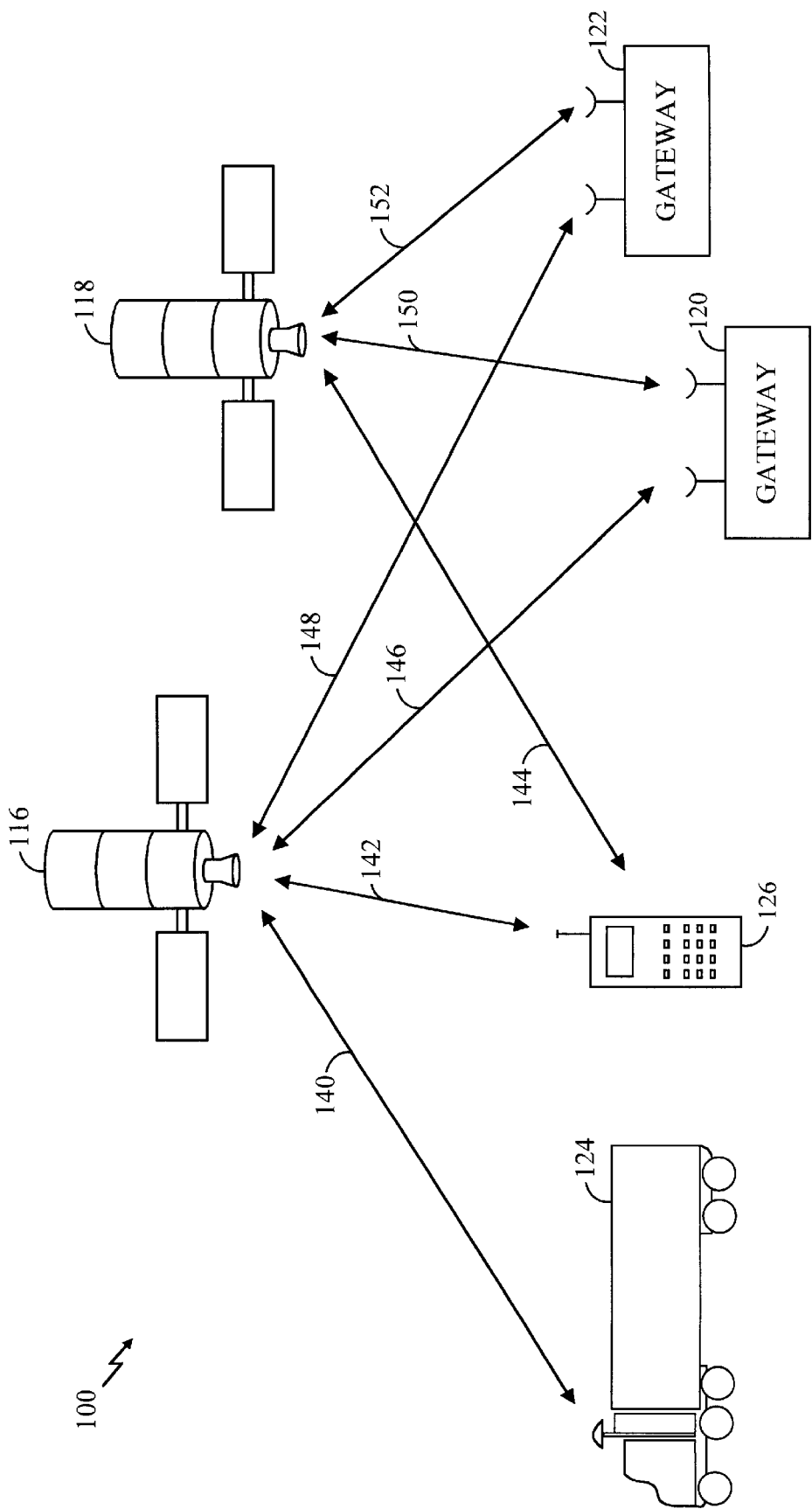
FIG. 1A illustrates an exemplary wireless communication system in which the present invention is useful.

An exemplary wireless communication system in which the present invention is useful is illustrated in FIG. 1A. It is contemplated that this communication system uses CDMA type communication signals, but this is not required by the present invention. In a portion of a communication system 100 illustrated in FIG. 1A, two satellites 116 and 118, and two associated gateways, base stations, or hubs 120 and 122 are shown for effecting communications with two remote user terminals 124 and 126. The total number of gateways and satellites in such systems depends on desired system capacity and other factors well understood in the art.

Figure 2:
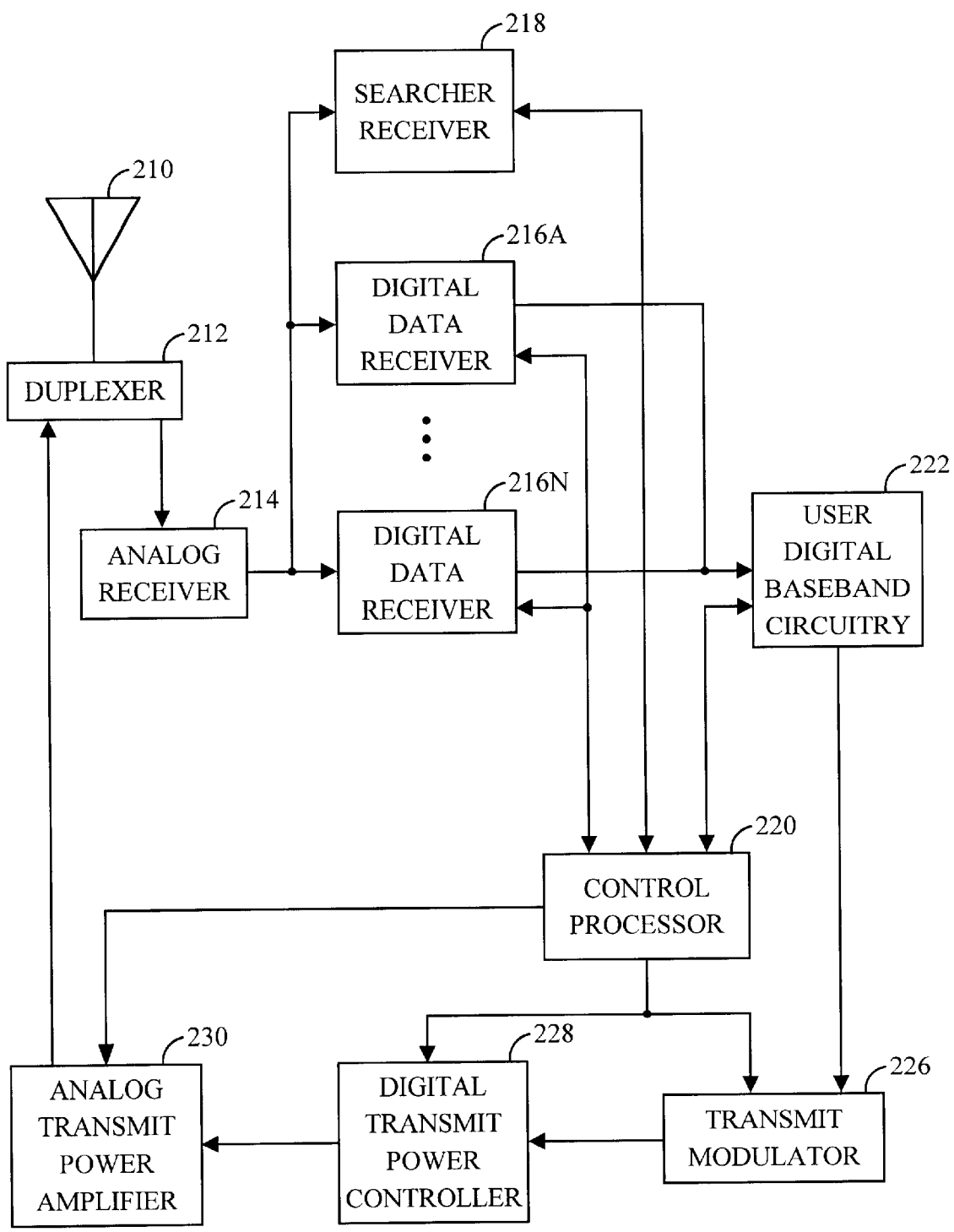
FIG. 2 illustrates an exemplary transceiver for use in a user terminal.

User terminals 124 and 126 each include a wireless communication device such as, but not limited to, a cellular or satellite telephone, a data transceiver, or a paging or position determination receiver, and can be hand-held or vehicle-mounted as desired. In FIG. 1A, user terminal 124 is illustrated as a vehicle mounted device and user terminal 126 is illustrated as a hand-held telephone. However, it is also understood that the teachings of the invention are applicable to fixed units where remote wireless service is desired. User terminals are sometimes also referred to as subscriber units, mobile stations, mobile units, or simply as "users" or "subscribers" in some communication systems, depending on preference. An exemplary transceiver for use in user terminals 124 and 126 is illustrated in FIG. 2.

Generally, beams from satellites 116 and 118 cover different geographical areas in predefined beam patterns. Beams at different frequencies, also referred to as FDMA channels or "sub-beams," can be directed to overlap the same region. It is also readily understood by those skilled in the art that beam coverage or service areas for multiple satellites might be designed to overlap completely or partially in a given region depending on the communication system design and the type of service being offered, and whether space diversity is being achieved.

Satellites 116 and 118 are two satellites of a satellite-based communication system. A variety of satellite-based communication systems have been proposed with an exemplary system employing on the order of 48 or more low Earth orbit (LEO) satellites, traveling in eight different orbital planes for servicing a large number of user terminals. However, those skilled in the art will readily understand how the teachings of the present invention are applicable to a variety of satellite system and gateway configurations, including other orbital distances and constellations.

In FIG. 1A, some possible signal paths are illustrated for communications between user terminals 124 and 126 and gateways 120 and 122, through satellites 116 and 118. The satellite-user terminal communication links between satellites 116 and 118 and user terminals 124 and 126 are illustrated by lines 140, 142 and 144. The gateway-satellite communication links, between gateways 120 and 122 and satellites 116 and 118, are illustrated by lines 146, 148, 150 and 152. Gateways 120 and 122 may be used as part of oneor two-way communication systems or simply to transfer messages or data to user terminals 124 and 126.

Figure 1B:
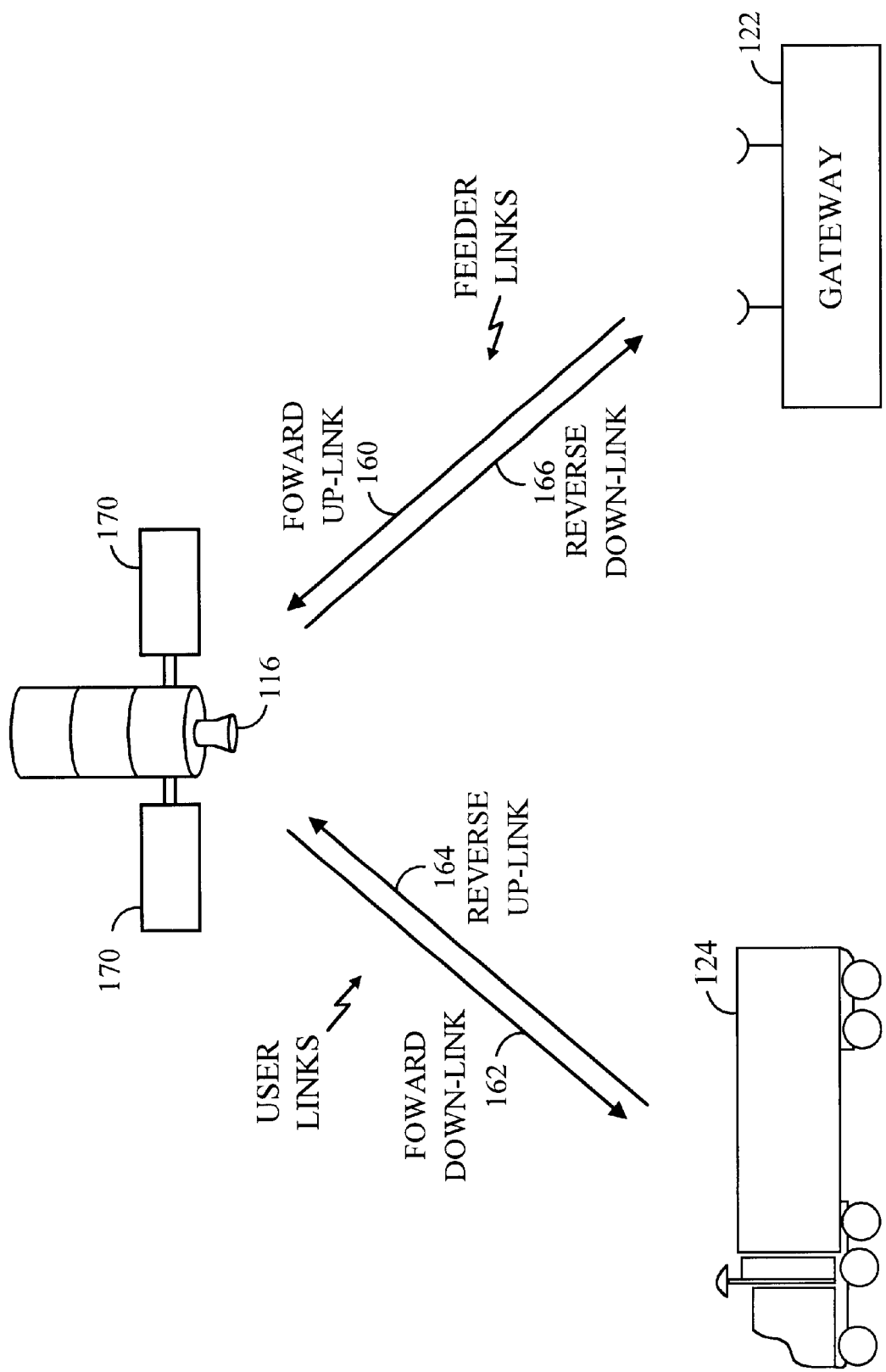
FIG. 1B illustrates exemplary communication links between a gateway and a user terminal.

FIG. 1B provides additional details of the communications between gateway 122 and user terminal 124 of communication system 100. Communication links between user terminal 124 and satellite 116 are generally termed user links and the links between gateway 122 and satellite 116 are generally termed feeder links. Communications proceeds in a "forward" direction from gateway 122 to satellite 116 on forward feeder link 160 and then down from satellite 116 to user terminal 124 on forward user link 162. In a "return" or "reverse" direction, communication proceeds up from user terminal 124 to satellite 116 on reverse user link 164 and then down from satellite 116 to gateway 122 on reverse feeder link 166.

In an example embodiment, information is transmitted by gateway 122 on forward links 160, 162 utilizing frequency division and polarization multiplexing. The frequency band used is divided up into a predetermined number of frequency "channels" or "beams." For example, the frequency band is divided into eight individual 16.5 MHz "channels" or "beams" using right hand circular polarization (RHCP) and eight individual 16.5 MHz "channels" or "beams" using left hand circular polarization (LHCP). These frequency "channels" or "beams" are further made up of a predetermined number of frequency division multiplexed (FDM) "subchannels" or "subbeams." For example, the individual 16.5 MHz channels may in turn be made up of up to 13 FDM "subchannels" or "subbeams", each of 1.23 MHz bandwidth. Each FDM subbeam can include multiple orthogonal channels over which communication signals are transferred (also referred to as CDMA channels), which are established using orthogonal codes. A majority of the orthogonal channels are traffic channels that provide messaging between user terminal 124 and gateway 122. The remaining orthogonal channels include pilot, sync and paging channels.

The pilot channel is transmitted by gateway 122 on forward link 160, 162 and is used by user terminal 124 to obtain initial system synchronization, and time, frequency and phase tracking for acquiring transmitted signals in beams or acquire a subbeam (CDMA carrier).

The sync channel is transmitted by gateway 122 on forward link 160, 162 and includes a repeating sequence of information which user terminal 124 can read after finding a pilot channel. This information is needed to synchronize user terminal 124 to the gateway 122 assigned to that subbeam. Paging channels are often used by gateway 122 on forward link 160, 162 to establish a communication link, to tell user terminal 124 that a call is coming in, to reply to a user terminal trying to access the system, and for registration of the user terminal. Additionally, as will be explained in further detail below, paging channels can also be used for sending short messages, such as a position update request, to user terminal 124.

The traffic channels are assigned on the forward and reverse links when a communication link is requested (for example, when a call is being placed). Messaging transfers between user terminal 124 and gateway 122 during a conventional communication link or phone call is accomplished using a traffic channel.

In the reverse direction, user terminal 124 transmits information to satellite 116 over user link 164. Satellite 116 receives these signals from multiple user terminals (over link 164) and frequency division multiplexes them together for the satellite-to-gateway feeder link 166. Reverse link 164 contains traffic channels and access channels.

An access channel is used by user terminal 124 on reverse link 164, 166 to "access" gateway 122. Access channels, which are well known in the relevant art, provide communications from a user terminal to a gateway when the user terminal is not using a traffic channel. This could be to register on the system, to establish a communication link, to place a call, or to acknowledge a page sent by gateway 122. Additionally, as will be explained in further detail below, an access channel can also be used for sending a short message, such as a position update, from user terminal 124 to gateway 122. One or more access channels are generally paired with a paging channel to provide a more efficient means of user terminals selecting channels to use in response to pages. In some CDMA systems, each access channel on a reverse link is distinguished by a different PN code, which may be different in length or chipping rate from other PN codes used in spreading communication signals in the communication system, as desired. User terminal 124 responds to a page message by transmitting on one of the associated access channels. Similarly, gateway 122 responds to transmission on a particular access channel by a message on the access channel's associated paging channel.

III. User Terminal Transceiver

An exemplary transceiver 200 for use in user terminals 124 and 126 is illustrated in FIG. 2. Transceiver 200 uses at least one antenna 210 for receiving communication signals, which are transferred to an analog receiver 214, where they are down-converted, amplified, and digitized. A duplexer element 212 is often used to allow the same antenna to serve both transmit and receive functions. However, some systems employ separate antennas for operating at different transmit and receive frequencies.

The digital communication signals output by analog receiver 214 are transferred to at least one digital data receiver 216A and at least one searcher receiver 218. Additional digital data receivers 216B–216N can be used to obtain desired levels of signal diversity, depending on the acceptable level of transceiver complexity, as would be apparent to one skilled in the relevant art.

At least one user terminal control processor 220 is coupled to digital data receivers 216A–216N and searcher receiver 218. Control processor 220 provides, among other functions, basic signal processing, timing, power and handoff control or coordination, and selection of frequency used for signal carriers. Another basic control function often performed by control processor 220 is the selection or manipulation of pseudonoise (PN) code sequences or orthogonal functions to be used for processing communication signal waveforms. Signal processing by control processor 220 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources.

The outputs of digital data receivers 216A–216N are coupled to digital baseband circuitry 222 within the user terminal. User digital baseband circuitry 222 comprises processing and presentation elements used to transfer information to and from a user terminal. That is, signal or data storage elements, such as transient or long term digital memory; input and output devices such as display screens, speakers, keypad terminals, and handsets; A/D elements, vocoders and other voice and analog signal processing elements; and the like, all form parts of the user digital baseband circuitry 222 using elements well known in the art. If diversity signal processing is employed, user digital baseband circuitry 222 can comprise a diversity combiner and decoder. Some of these elements may also operate under the control of, or in communication with, control processor 220.

When voice or other data is prepared as an output message or communications signal originating with the user terminal, user digital baseband circuitry 222 is used to receive, store, process, and otherwise prepare the desired data for transmission. User digital baseband circuitry 222 provides this data to a transmit modulator 226 operating under the control of control processor 220. The output of transmit modulator 226 is transferred to a power controller 228 which provides output power control to a transmit power amplifier 230 for final transmission of the output signal from antenna 210 to a gateway.

Transceiver 200 can also employ a precorrection element (not shown) in the transmission path to adjust the frequency of the outgoing signal. This can be accomplished using well known techniques of up- or down-conversion of the transmission waveform. In the alternative, a precorrection element (not shown) can form part of a frequency selection or control mechanism for the analog up-conversion and modulation stage (230) of the user terminal so that an appropriately adjusted frequency is used to convert the digital signal to a desired transmission frequency in one step.

Transceiver 200 can also employ a precorrection element (not shown) in the transmission path to adjust the timing of the outgoing signal. This can be accomplished using well known techniques of adding or subtracting delay in the transmission waveform.

Digital receivers 216A–N and searcher receiver 218 are configured with signal correlation elements to demodulate and track specific signals. Searcher receiver 218 is used to search for pilot signals, or other relatively fixed pattern strong signals, while digital receivers 216A–N are used to demodulate other signals associated with detected pilot signals. However, a data receiver 216 can be assigned to track the pilot signal after acquisition to accurately determine the ratio of signal chip energies to signal noise, and to formulate pilot signal strength. Therefore, the outputs of these units can be monitored to determine the energy in, or frequency of, the pilot signal or other signals. These receivers also employ frequency tracking elements that can be monitored to provide current frequency and timing information to control processor 220 for signals being demodulated.

Control processor 220 uses such information to determine to what extent the received signals are offset from the oscillator frequency, when scaled to the same frequency band, as appropriate. This and other information related to frequency errors and Doppler shifts can be stored in a storage or memory element 236, as desired.

IV. Gateway Transceiver

Figure 3:
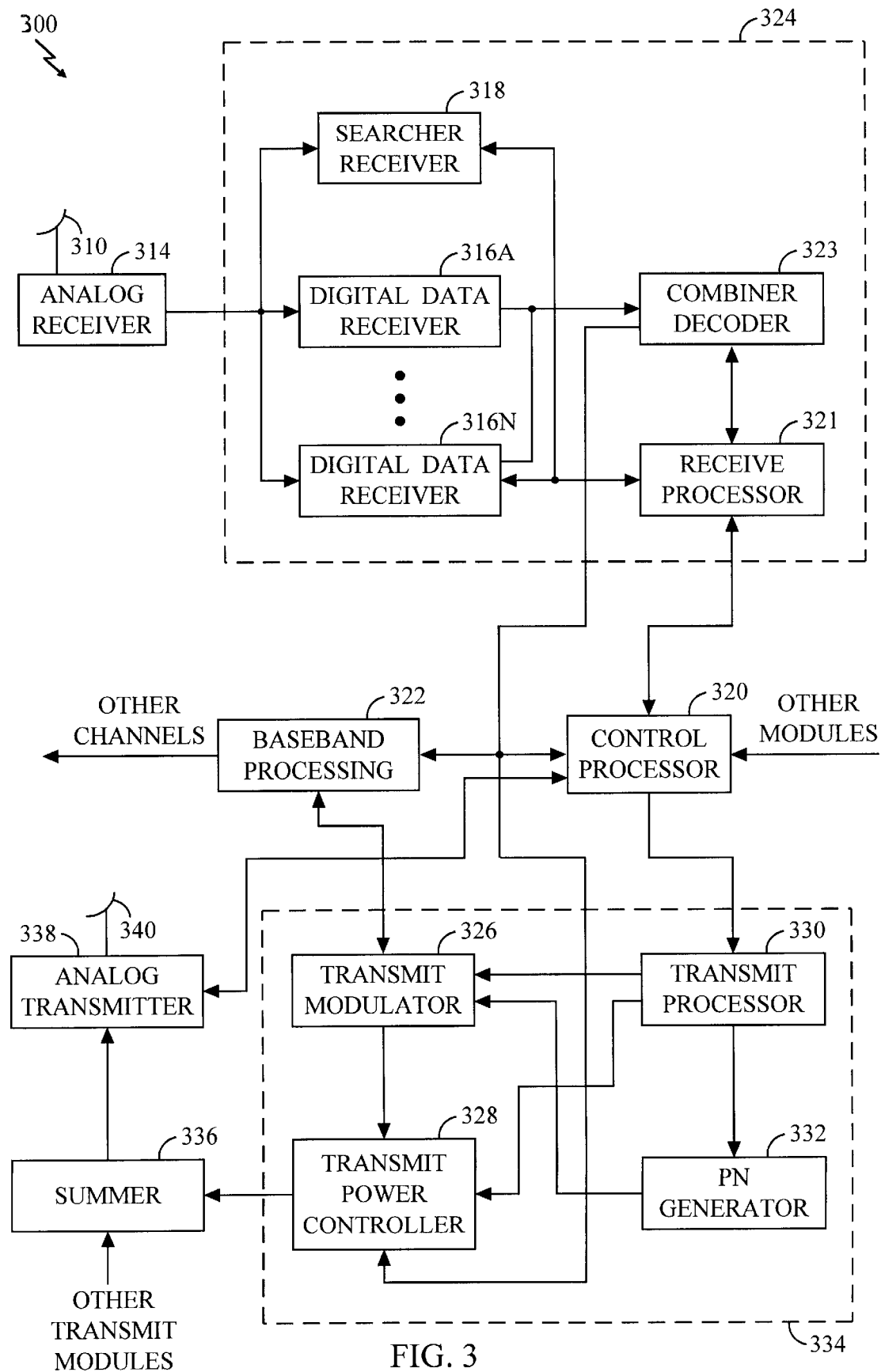
FIG. 3 illustrates exemplary transceiver apparatus for use in a gateway.

An exemplary transceiver apparatus 300 for use in gateways 120 and 122 is illustrated in FIG. 3. The portion of gateway 120, 122 illustrated in FIG. 3 has one or more analog receivers 314 connected to an antenna 310 for receiving communication signals which are then downconverted, amplified, and digitized using various schemes well known in the art. Multiple antennas 310 are used in some communication systems. Digitized signals output by analog receiver 314 are provided as inputs to at least one digital receiver module, indicated by dashed lines generally at 324.

Each digital receiver module 324 corresponds to signal processing elements used to manage communications between a gateway 120, 122 and one user terminal 124, 126, although certain variations are known in the art. One analog receiver 314 can provide inputs for many digital receiver modules 324, and a number of such modules are often used in gateways 120, 122 to accommodate all of the satellite beams and possible diversity mode signals being handled at any given time. Each digital receiver module 324 has one or more digital data receivers 316 and a searcher receiver 318. Searcher receiver 318 generally searches for appropriate diversity modes of signals other than pilot signals. Where implemented in the communication system, multiple digital data receivers 316A–316N are used for diversity signal reception.

The outputs of digital data receivers 316 are provided to subsequent baseband processing elements 322 comprising apparatus well known in the art and not illustrated in further detail here. Exemplary baseband apparatus includes diversity combiners and decoders to combine multipath signals into one output for each user. Exemplary baseband apparatus also includes interface circuits for providing output data to a digital switch or network. A variety of other known elements such as, but not limited to, vocoders, data modems, and digital data switching and storage components may form a part of baseband processing elements 322. These elements operate to control or direct the transfer of data signals to one or more transmit modules 334.

Signals to be transmitted to user terminals are each coupled to one or more appropriate transmit modules 334. A conventional gateway uses a number of such transmit modules 334 to provide service to many user terminals 124, 126 at a time, and for several satellites and beams at a time. The number of transmission modules 334 used by gateway 120, 122 is determined by factors well known in the art, including system complexity, number of satellites in view, user capacity, degree of diversity chosen, and the like.

Each transmit module 334 includes a transmit modulator 326 which spread-spectrum modulates data for transmission. Transmit modulator 326 has an output coupled to a digital transmit power controller 328, which controls the transmission power used for the outgoing digital signal. Digital transmit power controller 328 applies a minimum level of power for purposes of interference reduction and resource allocation, but applies appropriate levels of power when needed to compensate for attenuation in the transmission path and other path transfer characteristics. At least one PN generator 332 is used by transmit modulator 326 in spreading the signals. This code generation can also form a functional part of one or more control processors or storage elements used in gateway 122, 124.

The output of transmit power controller 328 is transferred to a summer 336 where it is summed with the outputs from other transmit modules. Those outputs are signals for transmission to other user terminals 124, 126 at the same frequency and within the same beam as the output of transmit power controller 328. The output of summer 336 is provided to an analog transmitter 338 for digital-to-analog conversion, conversion to the appropriate RF carrier frequency, further amplification and output to one or more antennas 340 for radiating to user terminals 124, 126. Antennas 310 and 340 may be the same antennas depending on the complexity and configuration of the system.

At least one gateway control processor 320 is coupled to receiver modules 324, transmit modules 334, and baseband circuitry 322; these units may be physically separated from each other. Control processor 320 provides command and control signals to effect functions such as, but not limited to, signal processing, timing signal generation, power control, handoff control, diversity combining, and system interfacing. In addition, control processor 320 assigns PN spreading codes, orthogonal code sequences, and specific transmitters and receivers for use in user communications.

Control processor 320 also controls the generation and power of pilot, synchronization, and paging channel signals and their coupling to transmit power controller 328. The pilot channel is simply a signal that is not modulated by data, and may use a repetitive unchanging pattern or non-varying frame structure type (pattern) or tone-type input to transmit modulator 326. That is, the orthogonal function, Walsh code, used to form the channel for the pilot signal generally has a constant value, such as all 1's or 0's, or a well known repetitive pattern, such as a structured pattern of interspersed 1's and 0's. If, as is usually the case, the Walsh code used is the all 0 code, this effectively results in transmitting only the PN spreading codes applied from PN generator 332.

While control processor 320 can be coupled directly to the elements of a module, such as transmit module 324 or receive module 334, each module generally comprises a module-specific processor, such as transmit processor 330 or receive processor 321, which controls the elements of that module. Thus, in a preferred embodiment, control processor 320 is coupled to transmit processor 330 and receive processor 321, as shown in FIG. 3. In this manner, a single control processor 320 can control the operations of a large number of modules and resources more efficiently. Transmit processor 330 controls generation of, and signal power for, pilot, sync, paging signals, traffic channel signals, and any other channel signals and their respective coupling to power controller 328. Receiver processor 321 controls searching, PN spreading codes for demodulation and monitoring received power.

For certain operations, such as shared resource power control, gateways 120 and 122 receive information such as received signal strength, frequency measurements, or other received signal parameters from user terminals in communication signals. This information can be derived from the demodulated outputs of data receivers 316 by receive processors 321. Alternatively, this information can be detected as occurring at predefined locations in the signals being monitored by control processor 320, or receive processors 321, and transferred to control processor 320. Control processor 320 uses this information to control the timing and frequency of signals being transmitted and processed using transmit power controllers 328 and analog transmitter 338.

V. Satellite Beam Patterns

Figure 4:
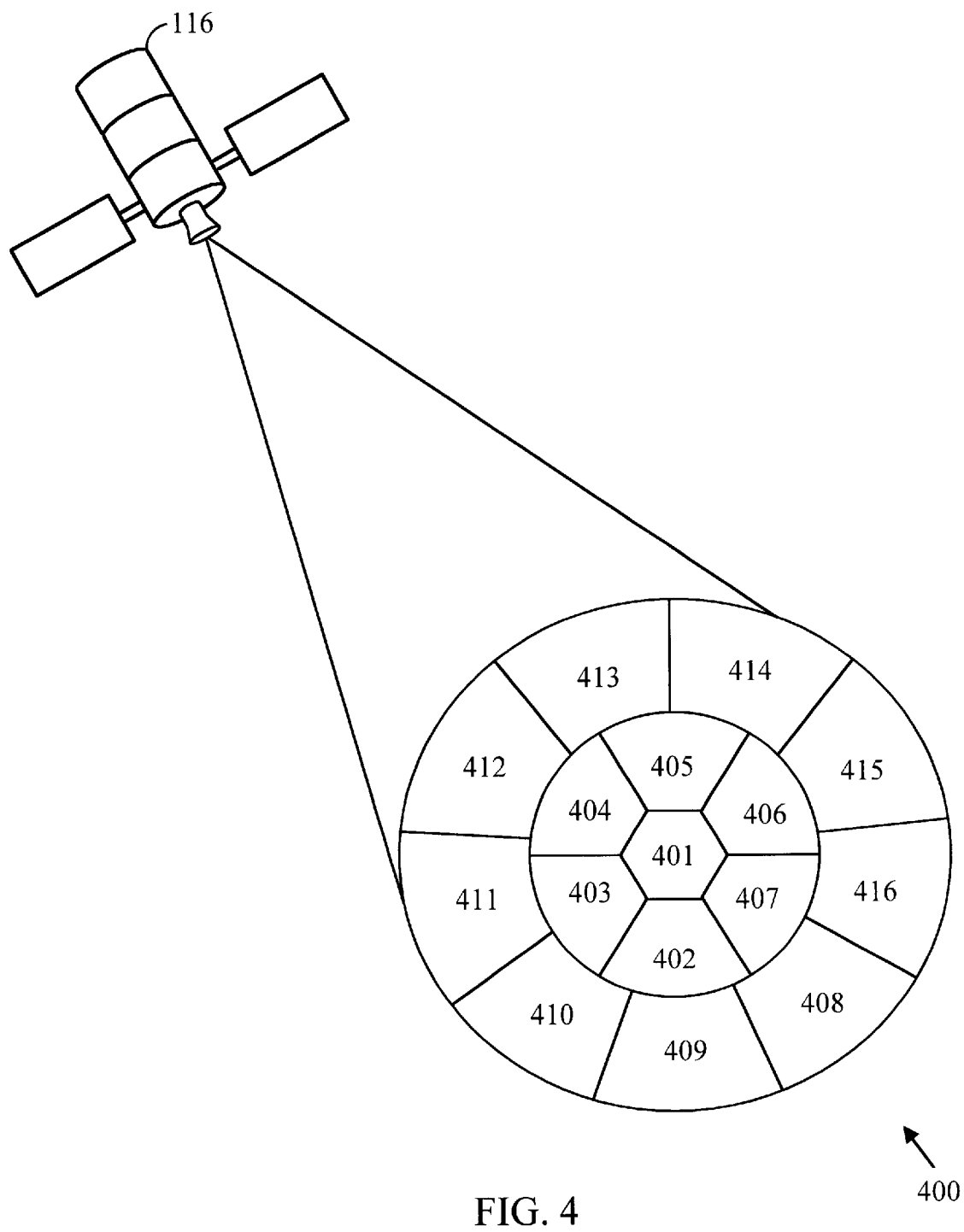
FIG. 4 illustrates an exemplary satellite footprint.

Generally, beams from satellites 116 and 118 cover different geographical areas in predefined beam patterns. Satellite beams are formed by, for example, a phased-array or beam forming antenna, as would be apparent to one skilled in the relevant art. FIG. 4 illustrates an exemplary satellite beam pattern, also known as a footprint. The footprint of a satellite is the geographic region on the surface of the Earth within the range of signals of the satellite. A diameter of a footprint is, for example, 3600 miles.

As shown in FIG. 4, the exemplary satellite footprint 400 includes sixteen beams 401–416. More specifically, satellite footprint 400 includes an inner beam (beam 401), middle beams (beams 402–407), and outer beams (beams 408–416). Each beam 401–416 covers a specific geographical area, although there usually is some beam overlap. These specific geographic areas can be several hundred miles across. Accordingly, each beam 401–416 has a beam coverage area which is a sub-area of footprint 400 of satellite 116.

Additionally, beams at different frequencies, also referred to as FDMA or CDMA channels or "sub-beams," can be directed to overlap the same region. Further, beam coverage areas for multiple satellites might be designed to overlap completely or partially in a given region depending on the communication system design and the type of service being offered, and whether space diversity is being achieved.

A variety of patterns are possible and it may be desirable to maintain different patterns for the forward and reverse communications links. An example of alternate link beam patterns is shown in U.S. patent application Ser. No. 08/723,723, entitled "Ambiguity Resolution For Ambiguous Position Solutions Using Satellite Beams," filed Sep. 30, 1996, now allowed, and incorporated herein by reference. However, the beam patterns of the forward and reverse communications links can be the same without departing from the spirit and scope of the present invention.

VI. Preferred Embodiment of the Invention

A preferred embodiment of the present invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the present invention. The present invention could find use in a variety of wireless information and communication systems, including those intended for position determination.

As discussed above, there is a need for a system and method for reducing the number of paging channels used to page a user terminal. These paging channels are used for sending information to a user terminal that is not in a communications session. For example, paging channels are often used by gateway 122 on forward link 160, 162 to establish a communication link, to tell user terminal 124 that a call is coming in (so called paging messages), to reply to a user terminal trying to access the system, and for registration of user terminal 124. In a preferred embodiment, the paging channels are also used to send a location update request message from gateway 122 to user terminal 124, send overhead messages, order messages, channel assignment messages, and Short Message Services (SMS) messages. Overhead messages are used to control a user terminal through transfer of commands. SMS messages allow the transfer of short digital messages to present information to a user, such as by display on a screen for viewing as visual paging messages, to indicate system status, or other information including news, business, or sports data.

The inventive method and apparatus of reducing the amount of power used to page a user terminal is described herein with reference to FIGS. 5–9. The method and apparatus of the present invention reduces the amount of power (per channel) that a satellite(s) must use to page the user terminal. This is accomplished by limiting the paging of a user terminal to when the user terminal is located within a so called "sweet spot" of a satellite. That is, in order to reduce the power required by a satellite to send a page to a user terminal, the user terminal should only be paged when the user terminal is located within a high signal strength "sweet spot" of a satellite.

Assume that gateway 122 had communicated with user terminal 124 at a time $t_1$ and thereby knows the location of user terminal 124 at time $t_1$. How gateway 122 had determined the location of user terminal 124 at time $t_1$ is discussed in further detail below. Now, assume that gateway 122 needs to page user terminal 124 at a later point in time than time $t_1$, wherein gateway 122 does not know the location of user terminal 124 at the later point in time. The purpose of the page may be for any of the uses discussed above, including to request a location update from user terminal 124.

In a conventional satellite communications system, gateway 122 would flood page (send a page over many, possibly all, of its paging channels) because it does not know the current location of user terminal 124. The present invention avoids flood paging by taking advantage of gateway 122 having knowledge of the location of user terminal 124 at a previous point in time, time $t_1$. The present invention also reduces the amount of power that a satellite needs to page user terminal 124 by waiting until user terminal 124 is within a "sweet spot" of the satellite, to page user terminal 124.

Before discussing further details of the present invention, below is a brief discussion of how gateway 122 could have determined the location of user terminal 124 at time $t_1$. Gateway 122 could have determined the location of user terminal 124 at time $t_1$ in a number of ways. For example, gateway 122 may have calculated the location of user terminal 124 at time $t_1$ based on information sent from user terminal 124 to gateway 122. This information may have been sent from user terminal 124 to gateway 122 when, for example, user terminal 122 registered with gateway 122, user terminal 122 attempted to initiate a call, and the like. Examples of systems and methods that can be used to determine a user terminal's location are disclosed in U.S. Pat. No. 5,126,748, issued Jun. 30, 1992, entitled "Dual Satellite Navigation System And Method," U.S. patent application Ser. No. 08/732,725, filed Jun. 23, 1998, entitled "Unambiguous Position Determination Using Two Low-Earth Orbit Satellites," U.S. patent application Ser. No. 08/732,722, filed Sep. 30, 1996, entitled "Passive Position Determination Using Two Low-Earth Orbit Satellites," and U.S. patent application Ser. No. 08/723,751, filed Sep. 30, 1996, entitled "Position determination Using One Low-Earth Orbit Satellite," each of which is assigned to the assignee of the present invention, and is incorporated herein by reference. These patents and applications discuss determining the location of a user terminal using information such as characteristics of communications signals transmitted to and from the user terminal and known positions and velocities of satellites. It is noted that the term "position" and "location" are used interchangeably herein.

Alternatively, user terminal 124 may have provided gateway 122 with its location at time $t_1$. User terminal 124 may have used any available method for determining its location at time $t_1$. In one embodiment, user terminal 124 includes a Global Positioning Satellite (GPS) receiver, which is well known in the art. Using the GPS receiver, user terminal 124 can determine and forward its location to gateway 122. User terminal 124 may also have determined its location using any other system or method such as a conventional LORAN-C system. User terminal 124 can forward location information to gateway 122 as an access probe on an access channel, embedded within other signals, or as a separate signal. In a preferred embodiment, user terminal 124 forwards the location information in the same access probe that acknowledges receipt of the page. The following features of the present invention apply regardless of how gateway 122 learns of the location or position of user terminal 124 at time $t_1$.

The present invention takes advantage of gateway 122 knowing the location of user terminal 124 at a previous point in time. More specifically, by knowing the location of user terminal 124 at time $t_1$, and by assuming that user terminal 124 could have only traveled a limited distance in the time period between time $t_1$, and time $t_2$, gateway 122 can hypothesize which satellite(s) has a footprint that covers user terminal 124 at time $t_2$ (and points in time after time $t_2$). Further, gateway 122 can hypothesize which specific beam (s) of the satellite(s) covers user terminal 124 at time $t_2$ (and points in time after time $t_2$). For example, if time $t_1$ was one hour prior to time $t_2$, it can be assumed that user terminal 124 did not travel any further than 80 miles in any direction from its location at time $t_1$, based on typical maximum travel speeds. Using such an assumption, gateway 122 can hypothesize which satellite(s) has a footprint that covers user terminal 124 at time $t_2$ (and points in time after time $t_2$). This can be done by assuming that user terminal 124 is within an area having an 80 mile radius originating at location 520. Additionally, gateway 122 can hypothesize which beam(s) of the satellite(s) covers user terminal 124 at time $t_2$ (and points in time after time $t_2$). More specific details of the present invention are described below.

As mentioned above, in order to reduce the power required by a satellite to send a page to a user terminal, the user terminal should only be paged when the user terminal is located within a predetermined preferential portion of the footprint of the satellite, also referred to as the "sweet spot" of a satellite. The "sweet spot" of a satellite is defined as the region on (or close to) the surface of the earth where the gain of signals transmitted by the satellite is highest (that is, best or "peaked up"). The "sweet spot" of a satellite can be specified from the perspective of a satellite or from the perspective of a point on (or close to) the surface of the Earth. Unless otherwise indicated, the "sweet spot" of a satellite is hereafter specified from the perspective of a point on the surface of the Earth, such as a present (or recalled) location of a user terminal.

One basis by which to specify or select the preferential location is using elevation angles for the satellite relative to the user terminal of interest. For example, a user terminal is considered to be within the "sweet spot" of a satellite when the satellite has an elevation angle equal to or between one pre-selected or computed angle, $\theta_1$ and a second selected or computed angle, $\theta_2$ from the perspective of the user terminal. Those skilled in the art will recognize that other parameters could be used to define the preferential location within a satellite footprint, elevation angles being generally the easiest to work with.

The specific values of elevation angles $\theta_1$ and $\theta_2$ are functions of satellite based communications system 100. That is, the specific elevation angles between which a satellite must be located for a user terminal to be located within the "sweet spot" of the satellite can vary depending on, for example, the design of beam forming antenna of the satellites of system 100. For simplicity, it is assumed that the "sweet spot" of each satellite of communications system 100 (for example, satellites 116 and 118) is the same. Examples of elevations angles $\theta_1$ and $\theta_2$ are 25 and 40 degrees, respectively.

Figure 5:
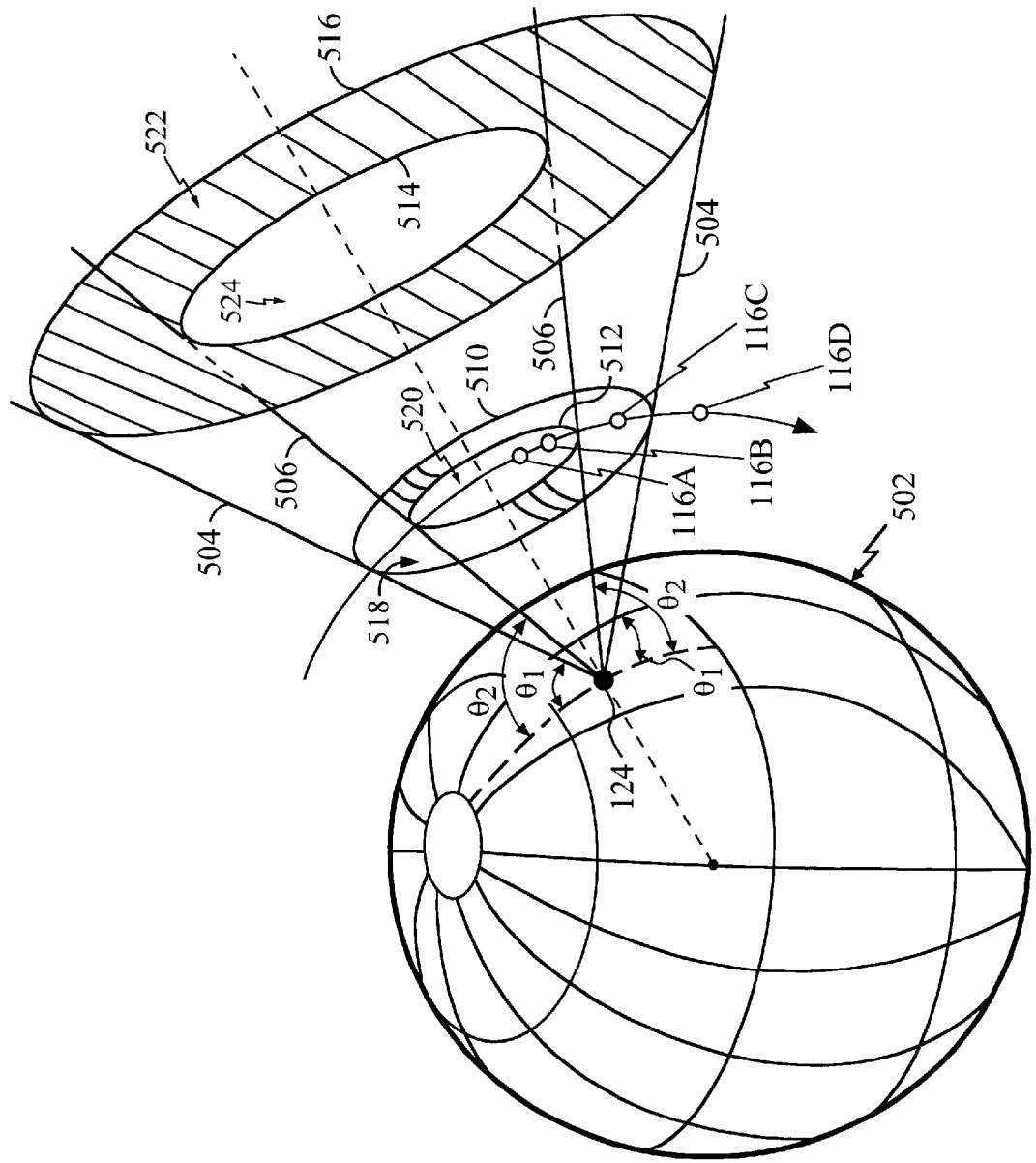
FIG. 5 illustrates the higher gain area of coverage or "sweet spot" of a satellite, from the perspective of a user terminal.

FIG. 5 shows user terminal 124 (on, or close to, the surface of the Earth 502) and satellite 116 at four different points in time (represented by 116A, 116B, 116C and 116D) as satellite 116 orbits around the Earth 502. Satellites 116 is one satellite of a multiple satellite system wherein the satellites orbit such that they are not stationary with respect to a point on the surface of the Earth. In a preferred embodiment, satellite 116 is moving on a scheduled basis and illuminating different regions on the surface of the Earth at different points in time. Using their constantly updated knowledge of the satellite constellation, these illuminated regions (i.e., footprints) can be tracked and predicted by gateways (such as gateway 122) of satellite based communications system 100.

Figure 6:
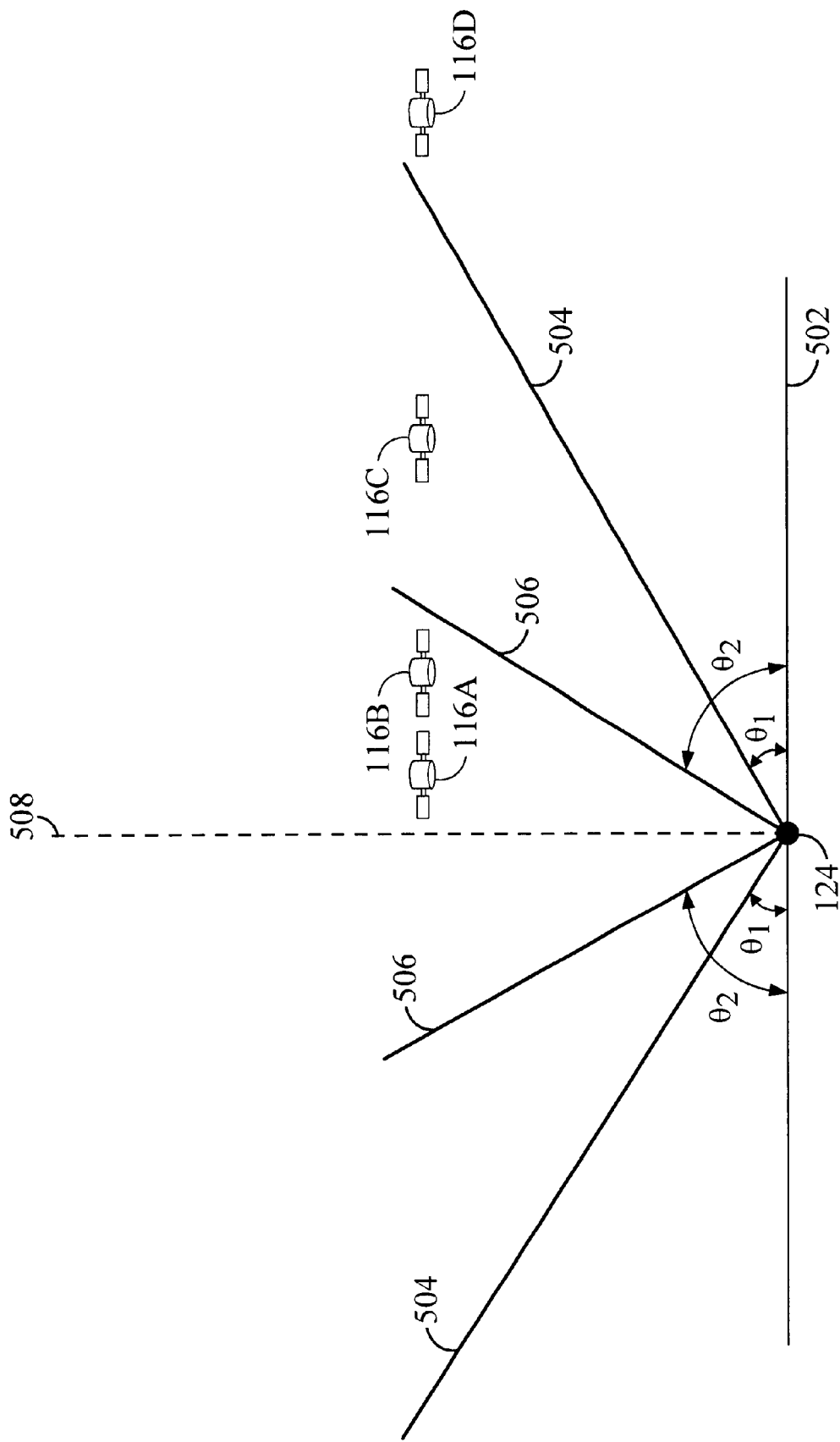
FIG. 6 is a side view of the beam pattern coverage of FIG. 5.
Figure 7:
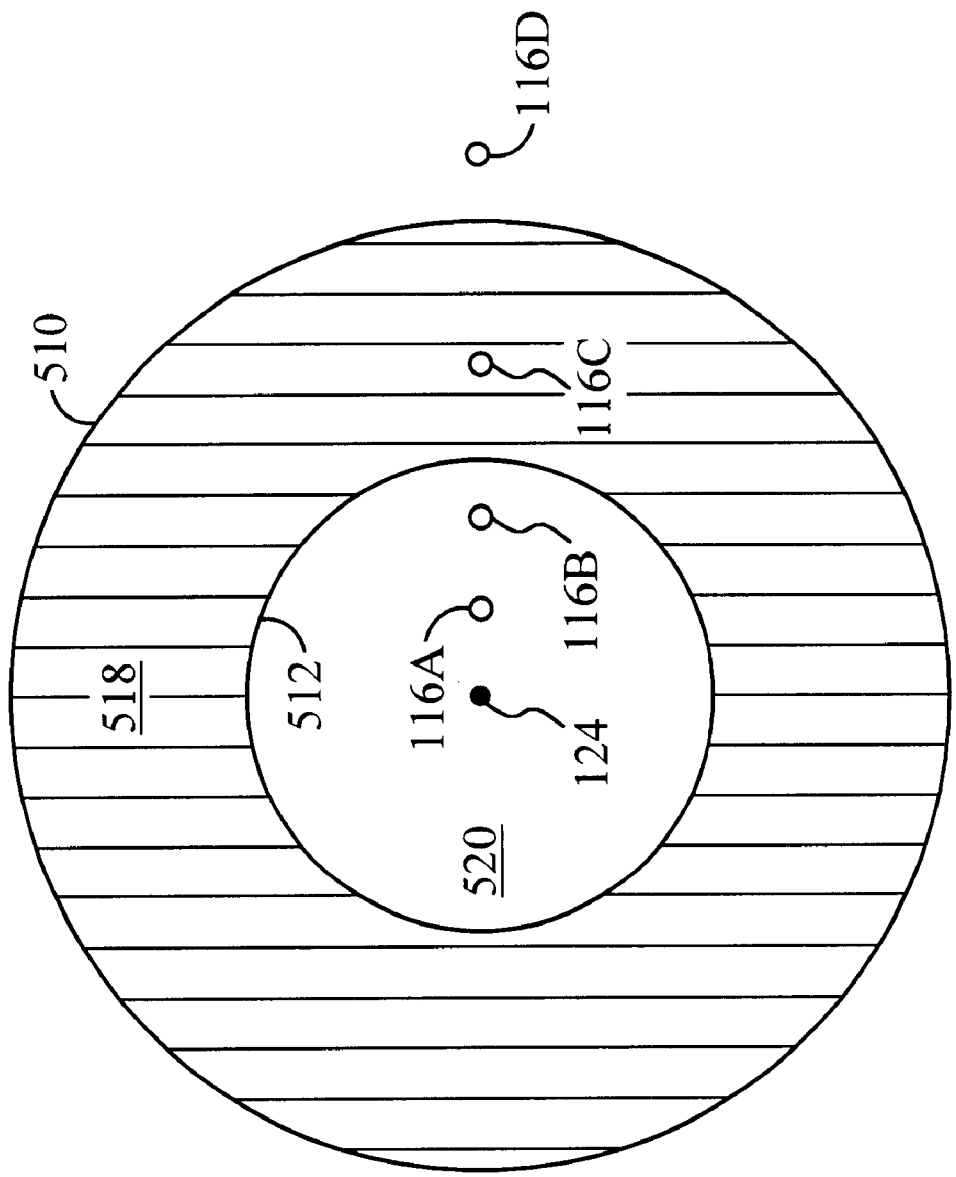
FIG. 7 is a top view of the beam pattern coverage relative to the satellite of FIG. 5.

FIGS. 6 and 7, illustrate a side view and a top view, respectively, of the beam pattern or sweet spot of FIG. 5. In each of FIGS. 5–7, line 508 represents an elevation angle of 90 degrees from the perspective of user terminal 124. Lines 504 and 506 represent the elevation angles $\theta_1$ and $\theta_2$, respectively, from the perspective of user terminal 124.

In order for user terminal 124 to be within the "sweet spot" of satellite 116, satellite 116 must have an elevation angle equal to or between $\theta_1$ and $\theta_2$, from the perspective of user terminal 124. Referring to FIGS. 5–7, to have an elevation angle between $\theta_1$ and $\theta_2$, satellite 116 must be within a region resembling a region, space or volume between two inverted cones, the pinnacles or focal points of which are located near user terminal 124. Referring specifically to FIGS. 5 and 7, circumference 510 (defined by elevation angle $\theta_1$) and circumference 512 (defined by elevation angle $\theta_2$), together define the sizes, diameters, or bases of the two cones, and a donut like cross section 518 residing on and between the two inverted cones. The donut like cross section 518 represents where the orbital plane of satellite 116 intersects (cuts through) the cones and the desired area of coverage. Similarly, referring only to FIG. 5, circumference 516 (defined by elevation angle $\theta_1$) and circumference 514 (defined by elevation angle $\theta_2$), together define a further donut like cross section 522 of the inverted cone that corresponds to an orbital plane which is farther from the Earth than the orbital plane of satellite 116.

At the points in time represented by 116A and 116B, satellite 116 is within a hollow (center) part of the second cone ($\theta_2$). When satellite 116 is within the hollow (center) part of this cone the elevation angle of satellite 116, from the perspective of user terminal 126, is greater than elevation angle $\theta_2$ (for example, greater than 40 degrees). At the point in time represented by 116D, satellite 116 is outside the first cone ($\theta_1$).

When satellite 116 is outside the cone the elevation angle of satellite 116, from the perspective of user terminal 124, is less than elevation angle $\theta_1$ (for example, less than 25 degrees). More specifically, if elevation angles $\theta_1$ and $\theta_2$ are 25 and 40 degrees respectively, satellite 116 may have an approximate elevation angle of 80 degrees at the point in time represented by 116A, 70 degrees at the point in time represented by 116B, 45 degrees at the point in time represented by 116C, and 25 degrees at the point in time represented by 116D. Thus, representation 116C is the only point in time along the satellite orbital path (of the four illustrated points in time) at which satellite 116 has an elevation angle between $\theta_1$ and $\theta_2$. Accordingly, user terminal 124 is within the "sweet spot" of satellite 116 at the point in time represented by 116C, but not the points in time represented by 116A, 116B, and 116D.

Figure 8D:
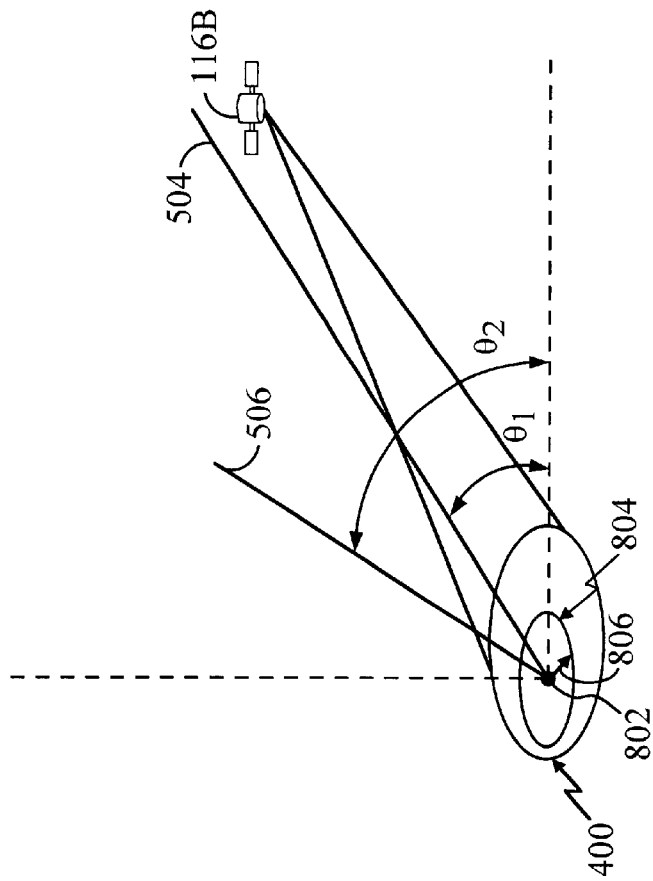
Figure 8C:
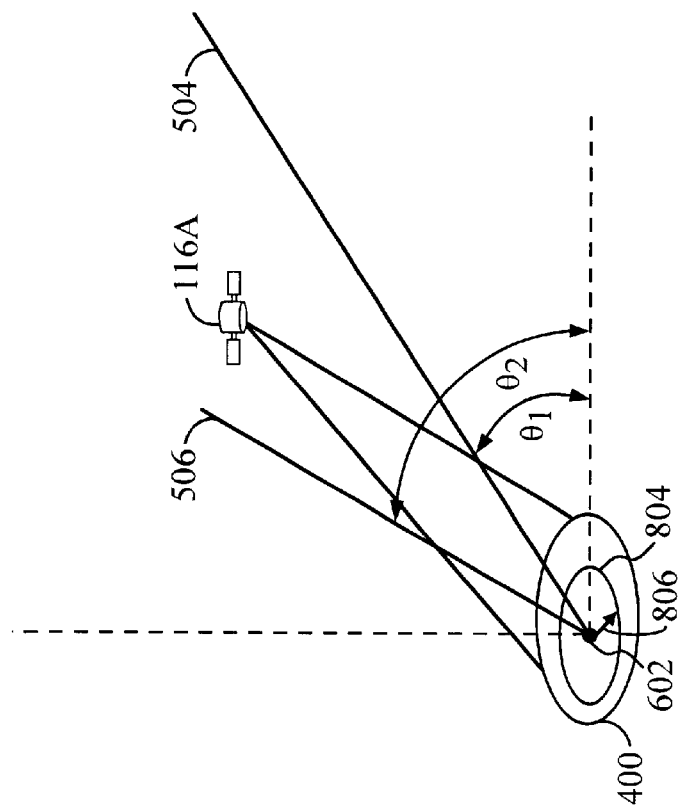

FIGS. 8A–8D illustrate satellite 116 at four different points in time, wherein FIG. 8A illustrates satellite 116 at a first point in time, FIG. 8B illustrates satellite 116 at a later point in time, FIG. 8C illustrates satellite 116 at an even later point in time, and FIG. 8D illustrates satellite 116 at a latest point in time. In addition to showing whether satellite 116 is within the "sweet spot" (that is, between elevation angles $\theta_1$ and $\theta_2$, from the perspective of recalled location 802 of user terminal 124), FIGS. 8A–8C also show whether footprint 400 of satellite 116 covers an area 804, within which user terminal 124 is assumed to be located. FIGS. 8A–8D differ from FIGS. 5–7 in that the perspective being discussed in FIGS. 8A–8D is that of recalled location 108 of user terminal 124, rather than an actual location of user terminal 124. Recalled location 802 is used because the actual location of user terminal 124 is generally unknown. Recalled location 802 and area 804 are discussed in more detail below.

Figure 9:
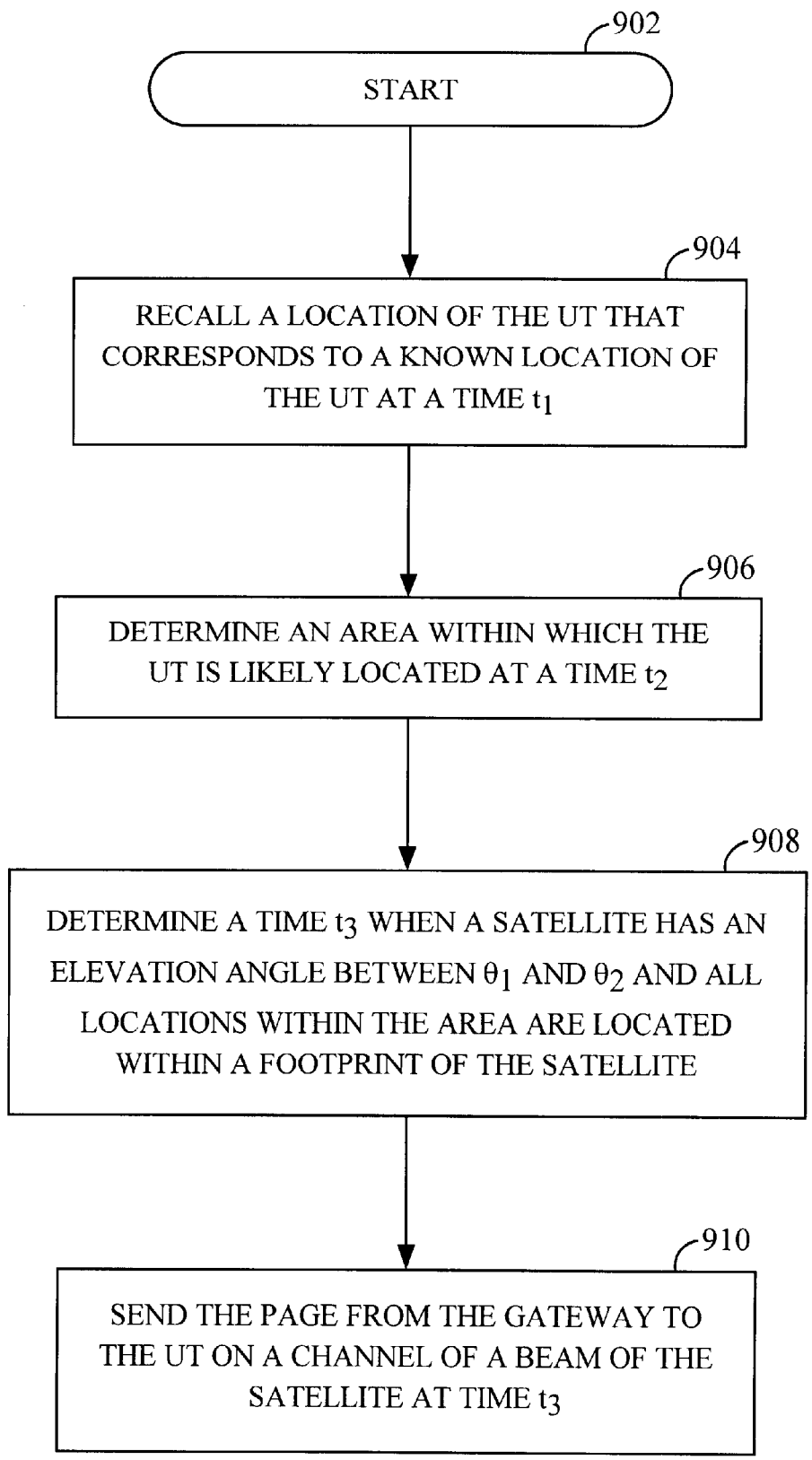
FIG. 9 is a flowchart depicting the high level operation of an embodiment of the present invention.

FIG. 9 provides a high level description of a preferred embodiment of the present invention. The method of FIG. 9 will be described with reference to FIGS. 8A–8D. The method of FIG. 9 begins in step 902, at a time $t_2$, when a gateway (for example, gateway 122) has been instructed to page a user terminal (such as user terminal 124).

In step 904, the location of user terminal 124 at time $t_1$, is recalled. This can be accomplished, for example, by performing a lookup in a table, list, or database stored in one or more memory elements or circuits, that is used to store location information of user terminals at different points in time. The location of user terminal 124 at time $t_1$ shall be referred to hereafter as recalled location 802. Recalled location 802 could have been determined using many known methods including those discussed above.

In step 906, an area 804 is determined based on recalled location 802. This area 804 represents a geographic region within which user terminal 124 is likely to be located at time $t_2$. Area 804 can have a defined radius 806 originating at recalled location 520. Radius 806 can have a fixed predetermined value, such as 100 miles. Alternatively, radius 806 can be a function of the time period between time $t_1$, and time $t_2$. An example algorithm for determining radius 806 is:

$R = (t_2 - t_1) \times D$ where

R is radius 806;

$t_2 - t_1$ is the time period (in hours) since user terminal 124 was located at recalled location 802; and D is the maximum distance that it is assumed user terminal 124 could have traveled in one hour (for example, at a velocity of 60 miles an hour).

Using this example algorithm, if the time period between time $t_1$, and time $t_2$ is 2 hours, and D is assumed to be 60 miles in one hour, then R is 120 miles. Of course, D can have another predetermined value or can be specific to each user terminal.

In step 908, using knowledge of the satellite constellation, including knowledge of the footprints (beam coverage areas) of the satellites at different points in time, a determination is made (at gateway 122 or at some other location that is in communication with gateway 122) of when a satellite will satisfy the following two specific criteria. First, the satellite must have an elevation angle between $\theta_1$ and $\theta_2$, such that user terminal 124 is within the "sweet spot" of the satellite. Second, all locations within area 804 must be located within a footprint of the satellite (that has an elevation angle between $\theta_1$ and $\theta_2$). The second criteria ensures that user terminal 124 can be paged, so long as user terminal 124 is located somewhere within area 804. For this discussion, the time at which both criteria will be satisfied will be referred to as time $t_3$, where $t_3 \geq t_2$ (for example, $t_3 = t_2 + 0.02$ hours). In one embodiment, to better ensure that user terminal 124 receives a page, radius 806 is increased (and thus area 804 is also increased) in proportion to a time period between time $t_3$ and time $t_2$, to account for an increased distance that user terminal 124 could have traveled during the time period between time $t_3$ and time $t_2$. That is, in order to account for unexpected changes in relative velocity or position. For some embodiments the sweet spot can also be defined as including elevation angles equal to $\theta_1$ and $\theta_2$, but for purposes of discussion it is assumed here that these angles represent inner and outer boundaries that are not that precise, so they are considered not "within" the spot.

In one embodiment, the determination of when a satellite has elevation angle between $\theta_1$ and $\theta_2$, is determined from the perspective of known location 802. In another embodiment, the determination of when a satellite has an elevation angle between $\theta_1$ and $\theta_2$ is determined from the perspective of all locations within area 804. This second embodiment ensures that user terminal 124 is within the "sweet spot" of a satellite when the page is sent, so long as user terminal 124 is located within area 804. Because it is simpler to discuss, the embodiment where $\theta_1$ and $\theta_2$ is determined from the perspective of known location 803 is described below.

Referring to FIGS. 8A–8D, assume that FIG. 8A is a snap shot taken at time $t_2$, and that FIGS. 8B–8D represent snap shots at future points in time (with respect to time $t_2$). Gateway 122 (or a system in communication with gateway 122) can predict the satellite positions illustrated by these snap shots (that is, FIGS. 8B–8D) using its knowledge of the satellite constellation. Notice that at time $t_2$ (as shown in FIG. 8A) satellite 116 does not satisfy either of the two criteria. That is, recalled location 802 is not within the sweet spot of satellite 116, and footprint 400 does not cover all locations within area 804.

Referring to FIG. 8B, notice that only one of the two criteria is satisfied. That is, even though footprint 400 covers all locations within area 804, recalled location 802 is not yet within the sweet spot of satellite 116.

It is not until the point in time represented by FIG. 8C that both criteria are satisfied. Accordingly, for this example the point in time represented by FIG. 8C can be time $t_3$ determined in step 908 discussed above.

Notice in FIG. 8D, recalled location 802 is no longer within the "sweet spot" of satellite 116.

Any of the multiple satellites of satellite communications system 100 may satisfy the above discussed criteria. Accordingly, since the satellite which will satisfy the two criteria is not predefined, both a time ($t_3$) and a satellite are being identified/determined in step 906.

It is possible that more than one satellite can simultaneously satisfy one or both criteria. In one embodiment, if two satellites both have an elevation angle between $\theta_1$ and $\theta_2$, then the second criteria can be met when all locations within area 802 are located within the combined footprints of the two satellites.

In step 910, once time $t_3$ is determined, gateway 122 sends a page to user terminal 124 at time $t_3$. In one embodiment, gateway 122 sends the page on a channel (for example, the paging channel) of every beam of (the plurality of beams that make up) the footprint of the satellite that satisfies the two criteria at time $t_3$. In an alternative embodiment, gateway 122 sends the page on a channel of only those beams (of the footprint) that have a coverage area that covers any location of area 802. Thus, in this alternative embodiment, a page will not be sent over channels of beams that do not cover any location within area 802. Accordingly, this further reduces the number of channels used to page user terminal 124. To perform this embodiment, a group (g1) of beams (transmitted by the satellite which satisfies the two criteria) that will have a coverage area that covers any location within area 802 at time $t_3$ is first determined. Then, the page is sent from gateway 122 to user terminal 124 on a paging channel of each of the group (g1) of beams at time $t_3$.

Figure 12:
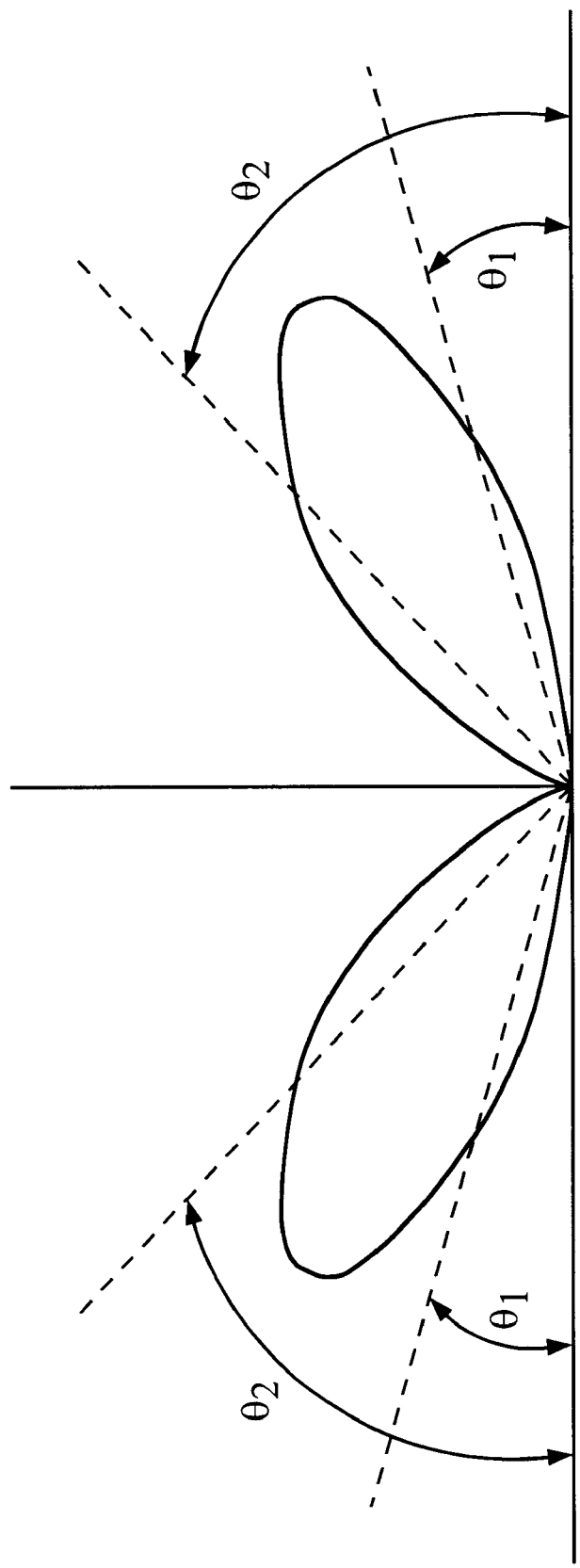
FIG. 12 shows an exemplary antenna beam pattern of an antenna of a user terminal according to an embodiment of the present invention.

In a preferred embodiment, where user terminal 124 is only paged when it is in the "sweet spot" of a satellite, the antenna 210 of transceiver 200 can be modified such that the antenna's gain is highest when it receives signals having an elevation angle of arrival between (or equal to) $\theta_1$ and $\theta_2$. In this preferred embodiment, antenna 210 is omni-directional in azimuth. FIG. 12 shows an exemplary antenna beam pattern of a preferred antenna 210 for use with user terminal 124. Note that the main lobes of the beam pattern are positioned between $\theta_1$ and $\theta_2$. Such an antenna would have high gain for signals having an elevation angle of arrival between $\theta_1$ and $\theta_2$, and a very low gain for signals having an elevation angle of arrival less than $\theta_1$ or greater than $\theta_2$. One having ordinary skill in the field of antennas would understand how to design such an antenna. An example of an antenna that can be designed to have these characteristics is a helical antenna. By designing antenna 210 to have a substantial gain within a specific range of angles, the amount of power used by a satellite to page user terminal 124, when user terminal 124 is in the "sweet spot" of the satellite, can be significantly reduced.

It is not necessary that user terminal 124 includes such a specially designed antenna. That is, even if user terminal 124 did not have an antenna modified such that the antenna's gain is highest when it receives signals having a specific elevation angle of arrival, the power of signals received by the user terminal 124 when it is located in the "sweet spot" of the satellite will still be higher (on the order of 1 dB to 3 dB higher) than if user terminal 124 were to receive signals when it was not located in the "sweet spot" of the satellite. That is, this technique creates a much higher UT gain for received signals than other paging signal reception techniques. However, when user terminal 124 has an antenna modified such that the antenna's gain is highest when it receives signals having an elevation angle of arrival between $\theta_1$ and $\theta_2$, the power of signals received by user terminal 124 will be significantly higher (on the order of 10 dB to 15 dB higher) when user terminal 124 is located in the "sweet spot" of the satellite (that is, when the satellite has an elevation angle between $\theta_1$ and $\theta_2$ with respect to user terminal 124).

It is noted that step 910 of sending a page from gateway 122 to user terminal 124 does not include the step of user terminal 124 receiving the page. Further, step 910 does not imply that user terminal 124 is actually located within a geographic region where it is capable of receiving the page (that is, the paging signal may be out of range of the user terminal). What occurs in step 910 is that gateway 122 sends a page over one or more channels of one or more beams that gateway 122 hypothesizes user terminal 124 is within. Thus, gateway 122 does not know whether user terminal 124 received the page until user terminal 124 sends a message to gateway 122 acknowledging receipt of the page.

In the above discussed embodiments of the present invention, a page is not sent to user terminal 124 until two criteria are satisfied. To further minimize the number of channels used to page user terminal 124, additional criteria may be added. An example of an additional criteria is that one beam covers all locations within area 804. With this additional criteria met, the number of channels used to page user terminal 124 can be reduced to one channel, so long as user terminal 124 knew which paging channel to monitor.

Assume that user terminal 124 only monitors a strongest (actual or theoretical) paging channel with respect to the user terminal's current location (or a recalled location). To increase the probability that user terminal 124 is actually monitoring the paging channel that gateway 122 uses to send a page, another criteria can be added. This further criteria can be that one beam covering all locations within area 804 theoretically has a power at all locations within area 804 that is a predetermined amount of power (for example, 10 dB) higher than any other beam covering any location with area 804. If this criteria were satisfied, and user terminal 124 was designed to always monitor the strongest paging channel, then the probability would be high that user terminal 124 would receive any page sent to it. In other words, there is a high probability that the strongest beam with respect to a current location (or recalled location) of user terminal 124, and a beam that is theoretically at least 10 dB higher than any other beam covering area 804, are the same beam.

Figure 10:
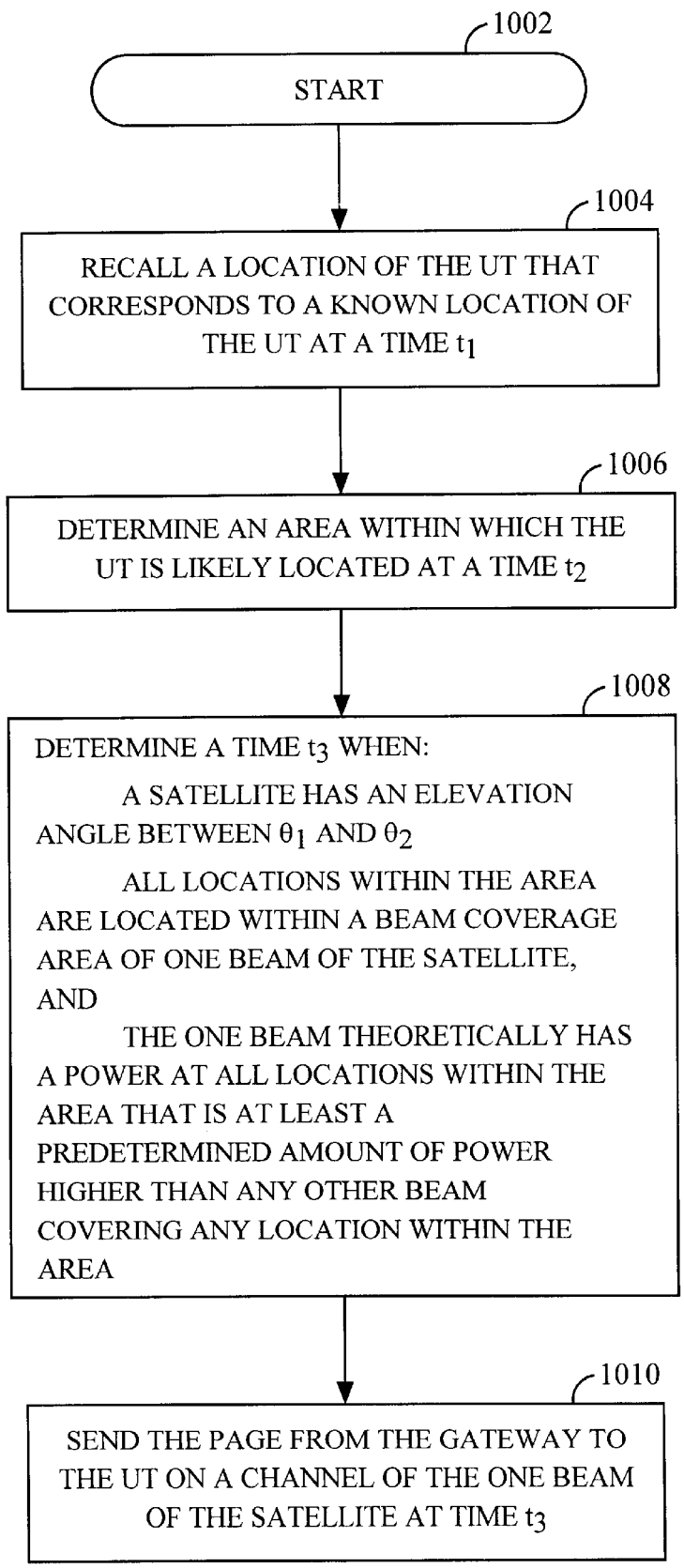
FIG. 10 is a flowchart depicting the high level operation of an alternative embodiment of the present invention.
Figure 11A:
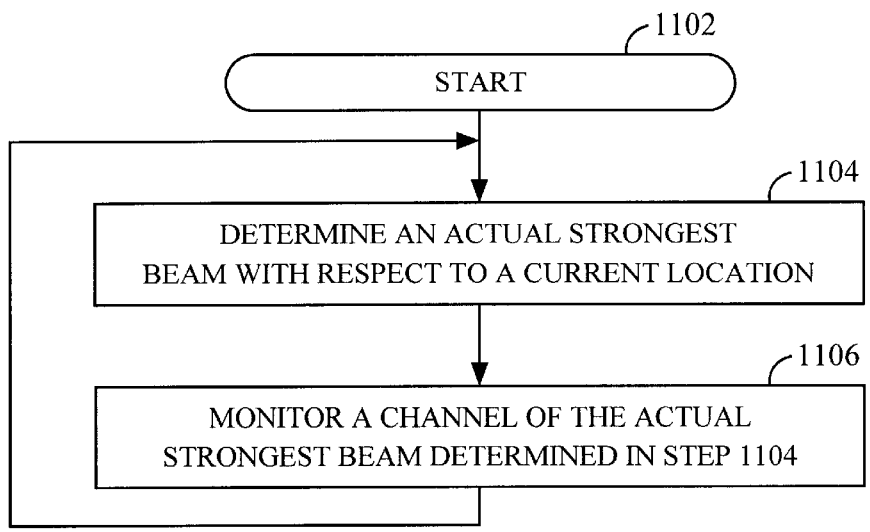
FIGS. 11A–11C are flowcharts depicting alternative methods performed by a user terminal in alternative embodiments of the present invention.
Figure 11B:
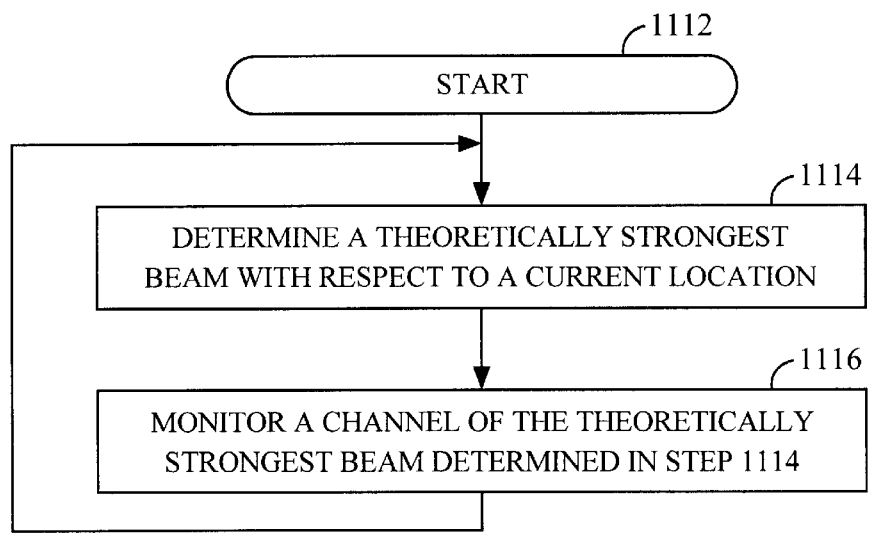
Figure 11C:
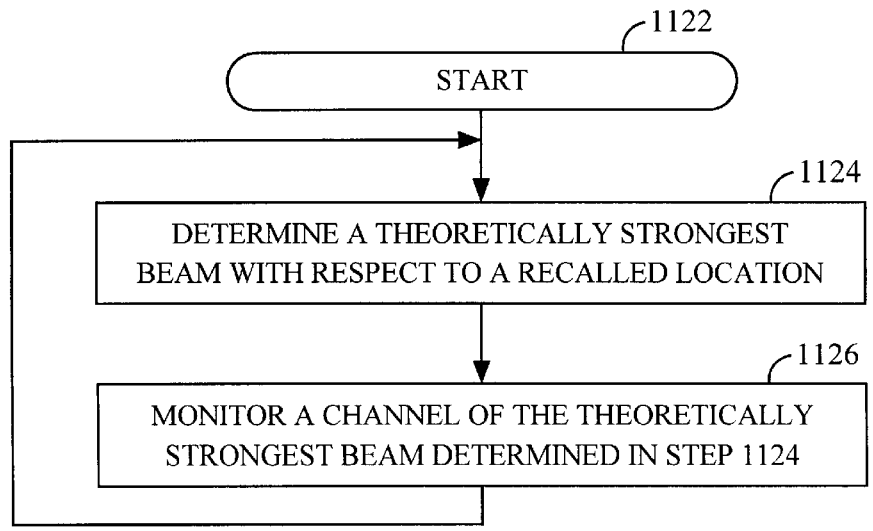

FIGS. 10 and 11A–11C illustrate, at a high level, the embodiment of the present invention where gateway 122 sends a page over a channel of a theoretically strongest beam. The steps of FIG. 10 are performed by gateway 122 or a facility in communication with gateway 122. The steps of FIGS. 11A–11C are performed by user terminal 124.

The method of FIG. 10 begins in step 1002, at a time $t_2$, when a gateway (for example, gateway 122) desires or has been instructed to page a user terminal (such as user terminal 124).

In step 1004, the location of user terminal 124 at time $t_1$, is recalled, as discussed above.

In step 1006, an area 804 is determined based on recalled location 802, wherein area 804 represents a geographic region within which user terminal 124 is likely to be located at time $t_2$, as discussed above with respect to step 906.

In step 1008, using knowledge of the satellite constellation, including knowledge of the beam coverage areas of the satellites at different points in time, a determination is made (at gateway 122 or at some other location that is in communication with gateway 122, such as a control or command center, dispatch office, and so forth) of when a satellite will satisfy the following three specific criteria. First, the satellite must have an elevation angle between $\theta_1$ and $\theta_2$, such that user terminal 124 is within the "sweet spot" of the satellite. Second, all locations within area 804 must be located within a beam coverage area of one beam of the satellite (that has an elevation angle between $\theta_1$ and $\theta_2$). Third, the one beam theoretically must have a power, at all locations within area 804, that is at least a predetermined amount of power (for example, 10 dB) higher than any other beam covering any location within area 804. For this discussion, the time at which all criteria will be satisfied shall be referred to as time $t_3$, where $t_3 \geq t_2$ (for example, $t_3 = t_2 + 0.02$ hours). In one embodiment, to better ensure that user terminal 124 receives a page, area 804 is increased in proportion to a time period between time $t_2$ and time $t_3$, to account for an increased distance that user terminal 124 could have traveled during the time period between time $t_2$ and time $t_3$, as before.

Finally, in step 1010, the page is then sent from gateway 122 to user terminal 124 on a channel (preferably, a paging channel) of the one beam of the satellite at time $t_3$.

FIGS. 11A–11C show the steps that can be performed by user terminal 124 to increase the probability that user terminal 124 is actually monitoring the channel over which gateway 122 sends the page in step 1010.

More specifically, FIG. 11A shows the steps performed by user terminal 124 in an embodiment where user terminal 124 monitors a channel of an actual strongest beam. In step 1104 user terminal 124 determines an actual strongest beam with respect to its current location. User terminal 124 can do this by measuring the signal strength of signals received over channels of various beams covering user terminal 124. In step 1106, user terminal 124 monitors a channel of the actual strongest beam determined in step 1104. User terminal 124 continually performs these steps such that it is generally monitoring a channel of the beam that is actually strongest with respect to its current location.

FIG. 11B shows the steps performed by user terminal 124 in an embodiment where user terminal 124 monitors a channel of a theoretically strongest beam. In step 1112, user terminal 124 determines a beam that theoretically has the highest power with respect to its current location. In step 1114 user terminal 124 monitors a channel of the theoretically strongest beam determined in step 1112. User terminal 124 continually performs these steps such that it is always monitoring a channel of the beam that is theoretically strongest with respect to its current location. If user terminal 124 is within the area determined by gateway 122 in step. 1006, then user terminal 124 should be monitoring a channel of the same beam that gateway 122 uses to send a page in step 1010.

FIG. 11C shows the steps performed by user terminal 124 in another embodiment where user terminal 124 in monitors a channel of a theoretically strongest beam. In step 1122 user terminal 124 determines a beam that theoretically has the highest power with respect to a recalled location. In one embodiment, the recalled location is the location at which user terminal 124 was located during its last communication with gateway 122 (for example, location 802). In step 1126, user terminal 124 monitors a channel of the theoretically strongest beam determined in step 1124. If user terminal 124 is within the area determined by gateway 122 in step 1006, then user terminal 124 should be monitoring a channel of the same beam that gateway 122 uses to send a page in step 1010

Additional details of determining a theoretically strongest beam are discussed in the commonly-invented and commonly-owned application, entitled "Method and System for Minimizing the Number of Channels Used for Paging" having application Ser. No. 09/305,180 filed May 4, 1999, which has been incorporated by reference.

In each of the above discussed embodiments, if user terminal 124 receives the page it sends an acknowledgment message to gateway 122 indicating that it has received the page. In a preferred embodiment, user terminal 124 sends this acknowledgment message as an access probe over an access channel that is associated with a paging channel over which user terminal 124 received the page.

As discussed above, gateway 122 may calculate the location of user terminal 124 based on either the characteristics of the acknowledgment message and/or the information included in the acknowledgment message. Once gateway 122 has determined the location of user terminal 122, a table or database of information including the locations of user terminals at different points in time can be updated. Further, the location information may be forwarded to another facility, such as a truck dispatcher facility, or a central system controller. Of course the page could have been sent for a reason other than requesting a position update. A person skilled in the relevant art will recognize that a page may have been used for other purposes without departing from the spirit and scope of the present invention.

The present invention can reduce the power required by paging channels used to page a user terminal. This results from using the largest gain portion of the satellite footprint, and allowing the use of directed beam antennas. As discussed above, the largest or highest gain portion of the satellite footprint, which is generally at least a few dB higher than the lower gain portions, is used for signal reception. The signal reception is limited to a preselected elevation pattern or range of angles. This elevation pattern can be effectively combined with the use of a directional or directed beam antenna for the UT to more efficiently transfer signals, receive pages and send access signals, based on the elevation angles of interest. The UT experiences a much higher gain for signal reception within the desired elevation constraints.

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

What I claim as my invention is:

1. In a satellite communications system comprising at least one gateway, one satellite, and a user terminal (UT), wherein the satellite produces a footprint formed by a plurality of beams and each beam includes a plurality of channels, a method for sending a page to the UT, comprising:
    (a) recalling a location of the UT that corresponds to a known location of the UT at a time $t_1$;
    (b) determining an area defined by a radius originating at the UT location, within which the UT is assumed to be located at a later time $t_2$, and based on a distance the UT could have traveled in a time period $t_2-t_1$;
    (c) determining when all locations within the area are located within a predetermined preferential higher gain portion of the footprint of the satellite at a time $t_3$, where $t_3 \geq t_2$; and
    (d) sending the page from the gateway to the UT on at least one of the channels.

2. The method of claim 1, wherein step (d) comprises:
    (i) determining a group ($g_1$) of beams that have a coverage area that covers any location within the area at the time $t_3$, wherein the group ($g_1$) of beams is selected from the plurality of beams that form the footprint; and
    (ii) sending the page from the gateway to the UT on a channel of each of the group ($g_1$) of beams at the time $t_3$.

3. The method of claim 1, wherein the UT employs a higher gain beam of the plurality of beams to receive pages which is available in said preferential portion of the footprint.

4. The method of claim 1, wherein the UT employs a higher gain beam of the plurality of beams to receive pages which is available within said sweet spot of the satellite.

5. The method of claim 1, wherein the UT employs a higher gain beam of the plurality of beams to receive pages which is available when said satellite has said predetermined preferential orbital position.

6. The method of claim 1, wherein said predetermined preferential portion of the footprint of the satellite is defined as a region in which the satellite has an elevation angle between $\theta_1$ and $\theta_2$ with respect to the UT location.

7. The method of claim 6, wherein the elevation angle is determined from a perspective of the all locations within the area such that the satellite has the elevation angle between $\theta_1$ and $\theta_2$ for the all locations within the area at the time $t_3$.

8. The method of claim 6, wherein the UT comprises an antenna with a gain that is highest when it receives a signal having an elevation angle of arrival between $\theta_1$ and $\theta_2$.

9. The method of claim 6, wherein the elevation angle is determined from a perspective of the UT location.

10. The method of claim 9, wherein $\theta_1$ is approximately 25 degrees and $\theta_2$ is approximately 40 degrees.

11. In a satellite communications system having at least one gateway, one satellite, and a user terminal (UT), wherein the satellite produces a footprint formed by a plurality of beams and each beam includes a plurality of channels, a method for sending a page to the UT, comprising:
    (a) recalling a location of the UT that corresponds to a known location of the UT at a time $t_1$;
    (b) determining an area defined by a radius originating at the UT location, within which the UT is assumed to be located at a later time $t_2$, and based on a distance the UT could have traveled in a time $t_2-t_1$;
    (c) determining a time $t_3$, where $t_3 \geq t_2$, when all locations within the area are within a "sweet spot" of the satellite; and
    (d) sending the page from the gateway to the UT at least one of the channels at the time $t_3$.

12. The method of claim 11, wherein said "sweet spot" relates to locations on, or close to, the surface of the Earth, where a gain of signals received from the satellite is peaked up.

13. The method of claim 11, wherein the area is determined as a function of a time period between the time $t_1$ and the time $t_3$.

14. The apparatus of claim 11, wherein the UT comprises an antenna with a gain that is highest when the UT is within said "sweet spot" of the satellite.

15. In a satellite communications system having at least one gateway, satellite, and user terminal (UT), wherein each satellite produces a footprint formed by a plurality of beams and each beam includes a plurality of channels, an apparatus for sending a page to the UT, comprising:
    means for recalling a location of the UT that corresponds to a known location of the UT at a time $t_1$;
    means for determining an area defined by a radius originating at the UT location, within which the UT is assumed to be located at a later time $t_2$, and based on a distance the UT could have traveled in a time $t_2-t_1$, when
    the satellite has a predetermined preferential orbital position relative to the UT, and
    all locations within the area are located within the footprint; and
    means for sending the page from the gateway to the UT on at least one of the channels at a time $t_3$.

16. The apparatus of claim 15, wherein the means for determining the radius increases the radius in proportion to a second time period between the time $t_2$ and the time $t_3$ to account for an increased distance from the UT location that the UT could have traveled during the second time period.

17. The apparatus of claim 15, further comprising means for determining a group ($g_1$) of beams that have a coverage area that covers any location within the area at the time $t_3$, wherein the group ($g_1$) of beams is selected from the plurality of beams that form the footprint and wherein the means for sending the page sends the page from the gateway to the UT on a channel of each of the group ($g_1$) beams at the time $t_3$.

18. The apparatus of claim 15, wherein said predetermined preferential orbital position of the satellite is defined as a location in which the satellite has an elevation angle between $\theta_1$ and $\theta_2$ with respect to the UT location.

19. The apparatus of claim 18, wherein the elevation angle is determined from a perspective of the UT location.

20. The apparatus of claim 18, wherein $\theta_1$ is approximately 25 degrees and $\theta_2$ is approximately 40 degrees.

21. The apparatus of claim 18, wherein the UT comprises an antenna with a gain that is highest when it receives signals having an elevation angle of arrival between $\theta_1$ and $\theta_2$.

22. The apparatus of claim 18, wherein the elevation angle is determined from a perspective of the all locations within the area such that the satellite has the elevation angle between $\theta_1$ and $\theta_2$ for the all locations within the area at the time $t_3$.

23. The apparatus of claim 22, wherein $\theta_1$ is approximately 25 degrees and $\theta_2$ is approximately 40 degrees.

24. In a satellite communications system comprising at least one gateway, one satellite, and a user terminal (UT), wherein the satellite produces a footprint formed by a plurality of beams and each beam includes a plurality of channels, an apparatus for sending a page to the UT, comprising:
   means for recalling a location of the UT corresponding to a known location of the UT at a time $t_1$;
   means for determining an area defined by a radius originating at the UT location, within which the UT is assumed to be located at a later time $t_2$, and based on a distance the UT could have traveled in a time period $t_2-t_1$;
   means for determining at a time $t_3$ where $t_3 \geq t_2$, when all locations within the area are within a "sweet spot" of the satellite; and
   means for sending the page from the gateway to the UT on at least one of the channels at the time $t_3$.

25. The apparatus of claim 24, wherein said "sweet spot" relates to locations on, or close to, the surface of the Earth, where a gain of signals received from the satellite is peaked up.

26. The apparatus of claim 24, wherein the area is determined as a function of a time period between the time $t_1$ and the time $t_3$.

27. The apparatus of claim 24, wherein the UT has an antenna with a gain that is highest when the UT is within said "sweet spot" of the satellite.

28. In a satellite communications system having at least one gateway and a plurality of satellites, wherein each satellite produces a footprint formed by a plurality of beams and each beam includes a plurality of channels, a method for sending a page to a user terminal UT, comprising:
   (a) recalling a location of the UT corresponding to a known location of the UT at a time $t_1$;
   (b) determining an area defined by a radius originating at the UT location, within which the UT is assumed to be located at a later time $t_2$, and based on a distance the UT could have traveled during a time period $t_2-t_1$;
   (c) determining a time $t_3$, where $t_3 \geq t_2$, when
      a satellite of the plurality of satellites has an elevation angle between $\theta_1$ and $\theta_2$, all locations within the area are located within a beam coverage area of one beam of the satellite, and
      the one beam theoretically has a power at all locations within the area that is at least a predetermined amount of power higher than any other beam covering any location within the area; and
   (d) sending the page from the gateway to the UT on at least one of the channels of the one beam at the time $t_3$.

29. The method of claim 28, wherein the UT has an antenna with a gain that is highest when it receives signals having an elevation angle of arrival between $\theta_1$ and $\theta_2$.

30. The method of claim 28, wherein said elevation angle is determined from a perspective of said known location.

31. The method of claim 30, wherein $\theta_1$ is approximately 25 degrees and $\theta_2$ is approximately 40 degrees.

32. The method of claim 28, wherein said elevation angle is determined from a perspective of said all locations within said area, such that said satellite has said elevation angle between $\theta_1$ and $\theta_2$ for said all locations within said area at time $t_3$.

33. The method of claim 32, wherein $\theta_1$ is approximately 25 degrees and $\theta_2$ is approximately 40 degrees.

34. In a satellite communications system having at least one gateway, a plurality of satellites, wherein each satellite produces a footprint formed by a plurality of beams and each beam includes a plurality of channels, an apparatus for sending a page to a user terminal (UT), comprising:
   means for recalling a location of the UT corresponding to a known location of the UT at a time $t_1$;
   means for determining an area defined by a radius originating at the UT location, within which the UT is assumed to be located at a later time $t_2$, and based on a distance the UT could have traveled in a time $t_2-t_1$;
   means for determining at a time $t_3$ where $t_3 \geq t_2$,
      a satellite of the plurality of satellites has an elevation angle between $\theta_1$ and $\theta_2$,
      all locations within the area are within a beam coverage area of one beam of the satellite, and
   the one beam theoretically has a power at all locations within the area that is at least a predetermined amount of power higher than any other beam covering any location within the area; and
   means for sending the page from the gateway to the UT on at least one of the channels of the one beam at the time $t_3$.

35. The apparatus of claim 34, wherein the UT has antenna with a gain that is highest when it receives a signal having an elevation angle of arrival between $\theta_1$ and $\theta_2$.

36. The apparatus of claim 34, wherein said elevation angle is determined from a perspective of said known location.

37. The apparatus of claim 36, wherein $\theta_1$ is approximately 25 degrees and $\theta_2$ is approximately 40 degrees.

38. The apparatus of claim 37, wherein the elevation angle is determined from a perspective of the all locations within the area, such that the satellite has the elevation angle between $\theta_1$ and $\theta_2$ for the all locations within the area at the time $t_3$.

39. The apparatus of claim 38, wherein $\theta_1$ is approximately 25 degrees and $\theta_2$ is approximately 40 degrees.

40. In a satellite communications system comprising a gateway, a satellite, and a user terminal (UT), a method for sending a page to the UT, comprising:
   (a) recalling a location of the UT corresponding to a known location of the UT at a time $t_i$;
   (b) determining an area defined by a radius originating at the UT location, within which the UT is assumed to be located at a later time $t_2$, and based on a distance the UT could have traveled during a time $t_2-t_1$;
   (c) determining a time $t_3$ where $t_3 \geq t_2$, when signals sent by the satellite will be received from a preferential area in space with respect to all locations within the area; and
   (d) sending the page from the gateway to the UT on at least one of the channels of the one beam at the time $t_3$.

41. The method of claim 40, wherein signals received from said preferential area in space have a peaked up gain.

42. The method of claim 40, wherein the UT employs a higher gain beam of the plurality of beams to receive pages which is available in said preferential area in space.

43. The method of claim 40, wherein the UT has antenna with a gain that is highest when it receives signals from said preferential area in space.

* * * * *